US009184933B2

(12) United States Patent
Nakamura et al.

(10) Patent No.: US 9,184,933 B2
(45) Date of Patent: Nov. 10, 2015

(54) COMMUNICATION MANAGEMENT APPARATUS, COMMUNICATION APPARATUS, AND COMMUNICATION METHOD

(75) Inventors: Masato Nakamura, Tokyo (JP); Hisafumi Koumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 420 days.

(21) Appl. No.: 13/142,239

(22) PCT Filed: Dec. 25, 2008

(86) PCT No.: PCT/JP2008/073639
§ 371 (c)(1),
(2), (4) Date: Jun. 24, 2011

(87) PCT Pub. No.: WO2010/073349
PCT Pub. Date: Jul. 1, 2010

(65) Prior Publication Data
US 2011/0255549 A1 Oct. 20, 2011

(51) Int. Cl.
H04L 12/433 (2006.01)
H04L 12/417 (2006.01)
H04L 12/403 (2006.01)

(52) U.S. Cl.
CPC ............ *H04L 12/433* (2013.01); *H04L 12/403* (2013.01); *H04L 12/417* (2013.01)

(58) Field of Classification Search
CPC ..... H04L 12/433; H04L 12/403; H04L 47/10; H04L 47/36; H04L 47/39; H04L 12/4637
See application file for complete search history.

(56) References Cited

U.S. PATENT DOCUMENTS 4,829,578 A * 5/1989 Roberts ......................... 704/233
5,613,073 A   3/1997 Hammond, Jr. et al.
(Continued)

FOREIGN PATENT DOCUMENTS

DE    112008003889 T5   6/2011
JP        01099344 A   4/1989
(Continued)

OTHER PUBLICATIONS

Japanese Decision of a Patent Grant in Japanese Patent Application No. 2011-128274 (Date Mailed: Feb. 5, 2013).
(Continued)

Primary Examiner — Yee Lam
(74) Attorney, Agent, or Firm — Sughrue Mion, PLLC; Richard C. Turner

(57) ABSTRACT

A communication management apparatus includes a token-circulation-order-information storing unit that stores token circulation order, a token-frame processing unit that determines whether transmission right acquiring apparatus information of the token frame indicates the own apparatus and transmits a token frame in which first transmission right acquisition determination information indicating a sequence number of a communication apparatus that can acquire a transmission right in the token circulation order, second transmission right acquisition determination information indicating the number of frames that can be transmitted during one token frame circulation, and transmission right acquiring apparatus information indicating the next transmission destination of the token frame after the own apparatus acquired from the token circulation order are set, and a data-frame-communication processing unit that transmits and receives the data frame, thereby to reduce time required until a communication node that acquired the token frame transmits data.

5 Claims, 34 Drawing Sheets

(56) References Cited

U.S. PATENT DOCUMENTS

| | | | |
|---|---|---|---|
| 6,104,714 A * | 8/2000 | Baudelot et al. | 370/396 |
| 6,460,101 B1 | 10/2002 | Arimilli et al. | |
| 6,529,945 B1 * | 3/2003 | Calhoun et al. | 709/213 |
| 6,714,541 B1 | 3/2004 | Iyer et al. | |
| 7,274,660 B2 | 9/2007 | Hill et al. | |
| 8,213,455 B2 | 7/2012 | Nakamura | |
| 8,452,843 B2 | 5/2013 | Yabusaki et al. | |
| 2002/0087716 A1 * | 7/2002 | Mustafa | 709/236 |
| 2002/0181505 A1 | 12/2002 | Denecheau | |
| 2003/0041164 A1 * | 2/2003 | Denecheau et al. | 709/232 |
| 2003/0061389 A1 * | 3/2003 | Mazza | 709/248 |
| 2003/0165130 A1 | 9/2003 | Wodzianek et al. | |
| 2005/0135284 A1 * | 6/2005 | Nanda et al. | 370/294 |
| 2007/0268913 A1 | 11/2007 | Denecheau et al. | |
| 2009/0010161 A1 * | 1/2009 | Zhang et al. | 370/235 |
| 2009/0041057 A1 | 2/2009 | Dickens et al. | |
| 2009/0097419 A1 | 4/2009 | Nakamura | |
| 2010/0214962 A1 | 8/2010 | Nakamura | |
| 2010/0217791 A1 | 8/2010 | Nakamura | |
| 2011/0093559 A1 | 4/2011 | Yabusaki et al. | |

FOREIGN PATENT DOCUMENTS

| | | | |
|---|---|---|---|
| JP | 05344135 A | 12/1993 | |
| JP | 09252312 A | 9/1997 | |
| JP | 10135992 A | 5/1998 | |
| JP | 11032065 A | 2/1999 | |
| JP | 11-088392 A | 3/1999 | |
| JP | 11-234310 A | 8/1999 | |
| JP | 11-234313 A | 8/1999 | |
| JP | 2002-281052 A | 9/2002 | |
| JP | 3487324 B2 | 1/2004 | |
| TW | 200803305 A | 6/2006 | |

OTHER PUBLICATIONS

Taiwanese Office Action in Taiwanese Application No. 098102775 dated Dec. 18, 2012.

Japanese decision of a patent grant mailed Jan. 8, 2013.

United States Patent and Trademark Office, "Non-Final Office Action," issued in connection with U.S. Appl. No. 13/325,125, dated Mar. 27, 2014.

German Patent and Trademark Office, "Official Action," issued in connection with German Patent Application No. 11 2008 004 203.9, dated Apr. 29, 2014.

Taiwanese Office Action; Application No. 101102132; Dec. 13, 2013.

German Patent and Trademark Office, "Official Action," issued in connection with German Patent Application No. 11 2008 004 268.3, dated May 2, 2014.

United States Patent and Trademark Office, "Final Office Action," issued in connection with U.S. Appl. No. 13/325,125, dated Sep. 5, 2014.

United States Patent and Trademark Office, "Advisory Action," issued in connection with U.S. Appl. No. 13/325,125, dated Jan. 2, 2015.

Communication dated Mar. 23, 2015, issued by the United States Patent and Trademark Office in Application No. 13325125.

* cited by examiner

FIG.3

| DA | SA | type | FRAME TYPE INFORMATION (Token) | TRANSMISSION RIGHT ACQUIRING APPARATUS INFORMATION | TOKEN REPEAT COUNTER | TRANSMISSION PERMITTED STATION VALUE | NUMBER OF TRANSMITTABLE FRAMES | NUMBER-OF-TRANSMITTABLE-FRAMES "0" SETTING STATION | FCS |
|---|---|---|---|---|---|---|---|---|---|
| 201 | 202 | 203 | 205 | 206 | 207 | 208 | 209 | 210 | 211 |

DATA 204

| COMMUNICATION STEP | ASSOCIATED FIGURE | COMMUNICATION NODE THAT ACQUIRED THE TRANSMISSION RIGHT | TRANSMISSION WAITING FRAME | UN-TRANSMITTED FRAMES AT THE TIME OF NUMBER OF TRANSMITTABLE FRAMES "0" SETTING | UN-TRANSMITTED FRAMES AT THE TIME OF LAST TOKEN RECEPTION |
|---|---|---|---|---|---|
| 1 | FIG. 7-1 | master station A | F1, F2, F3, F4, and F5 | None | None |
| 2 | FIG. 7-2 | master station A | None | None | None |
| 3 | FIG. 7-3 | slave station B | F6 and F7 | F7 | F7 |
| 4 | FIG. 7-4 | slave station C | F8 | None | F8 |
| 5 | FIG. 7-5 | master station A | F9 and F10 | None | None |
| 6 | FIG. 7-6 | master station A | F9 and F10 | None | F9 and F10 |
| 7 | FIG. 7-7 | slave station B | F7, F11, F12, F13 and F14 | None | F11, F12, F13 and F14 |
| 8 | FIG. 7-8 | slave station C | F8 and F15 | None | F15 |
| 9 | FIG. 7-9 | master station A | None | None | None |

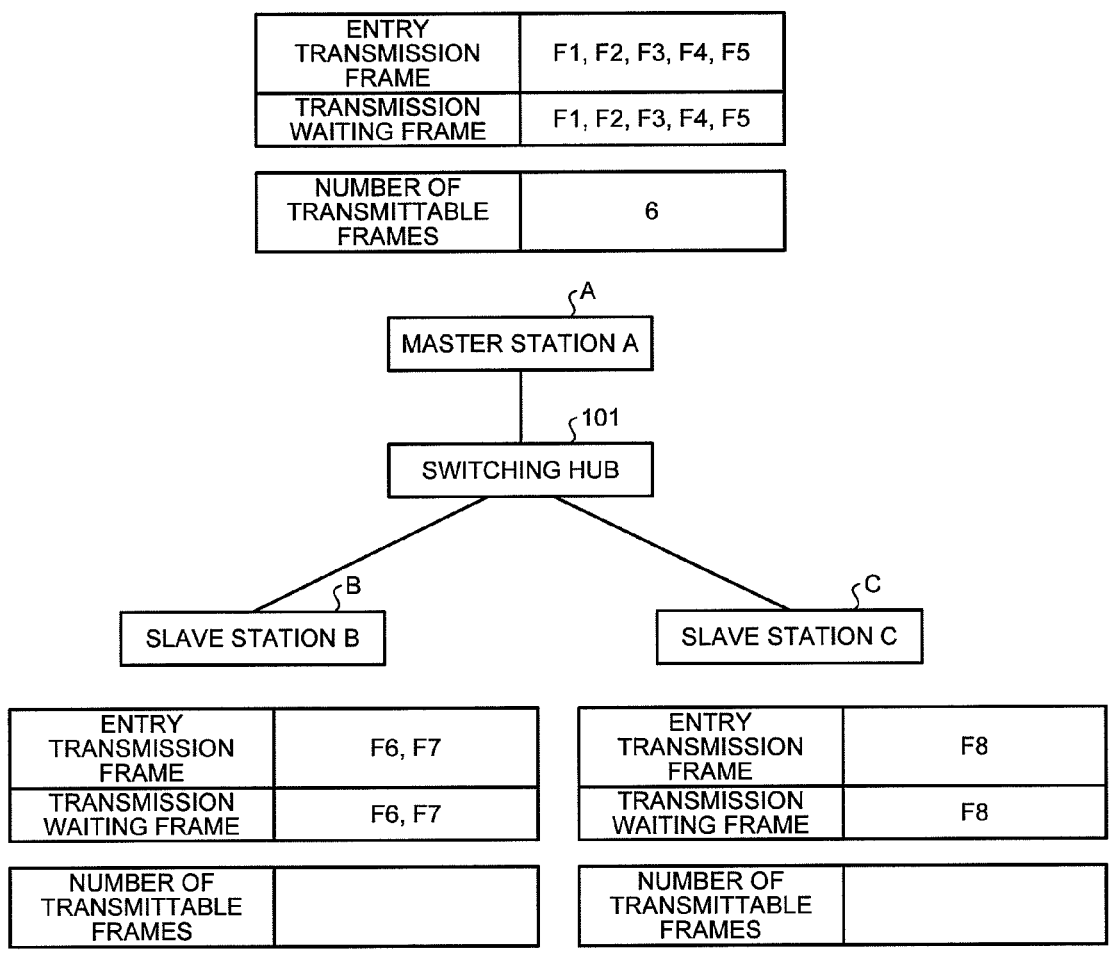

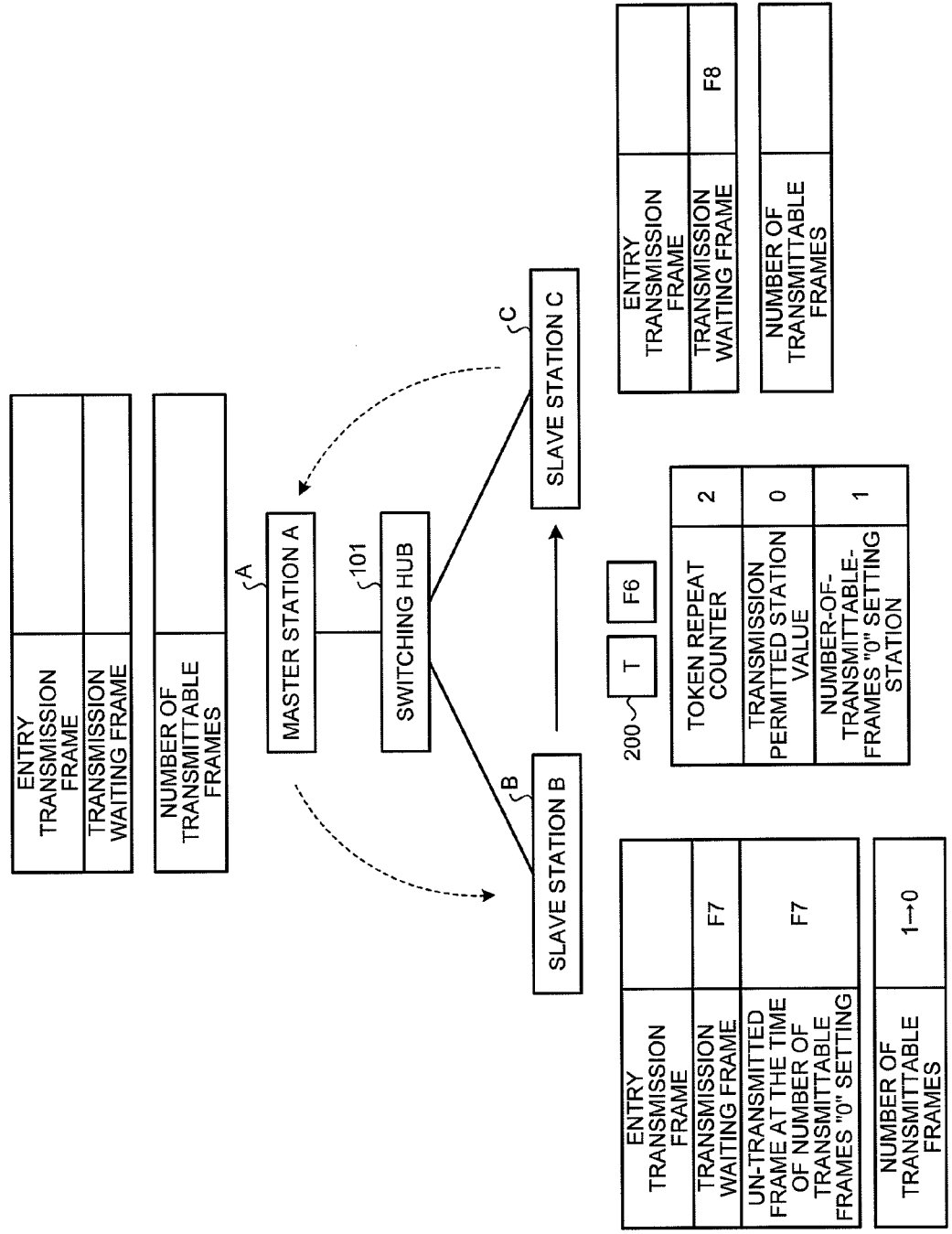

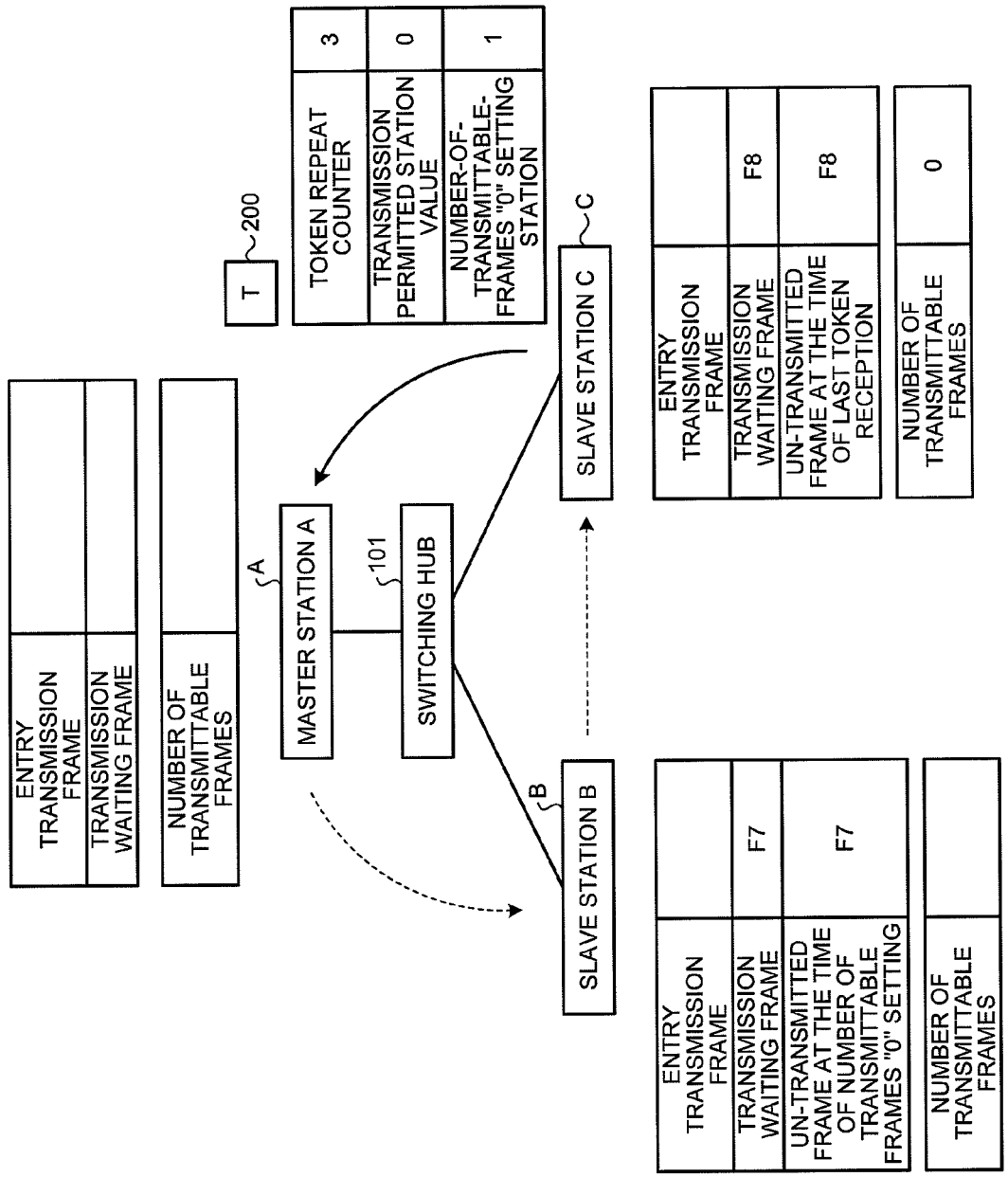

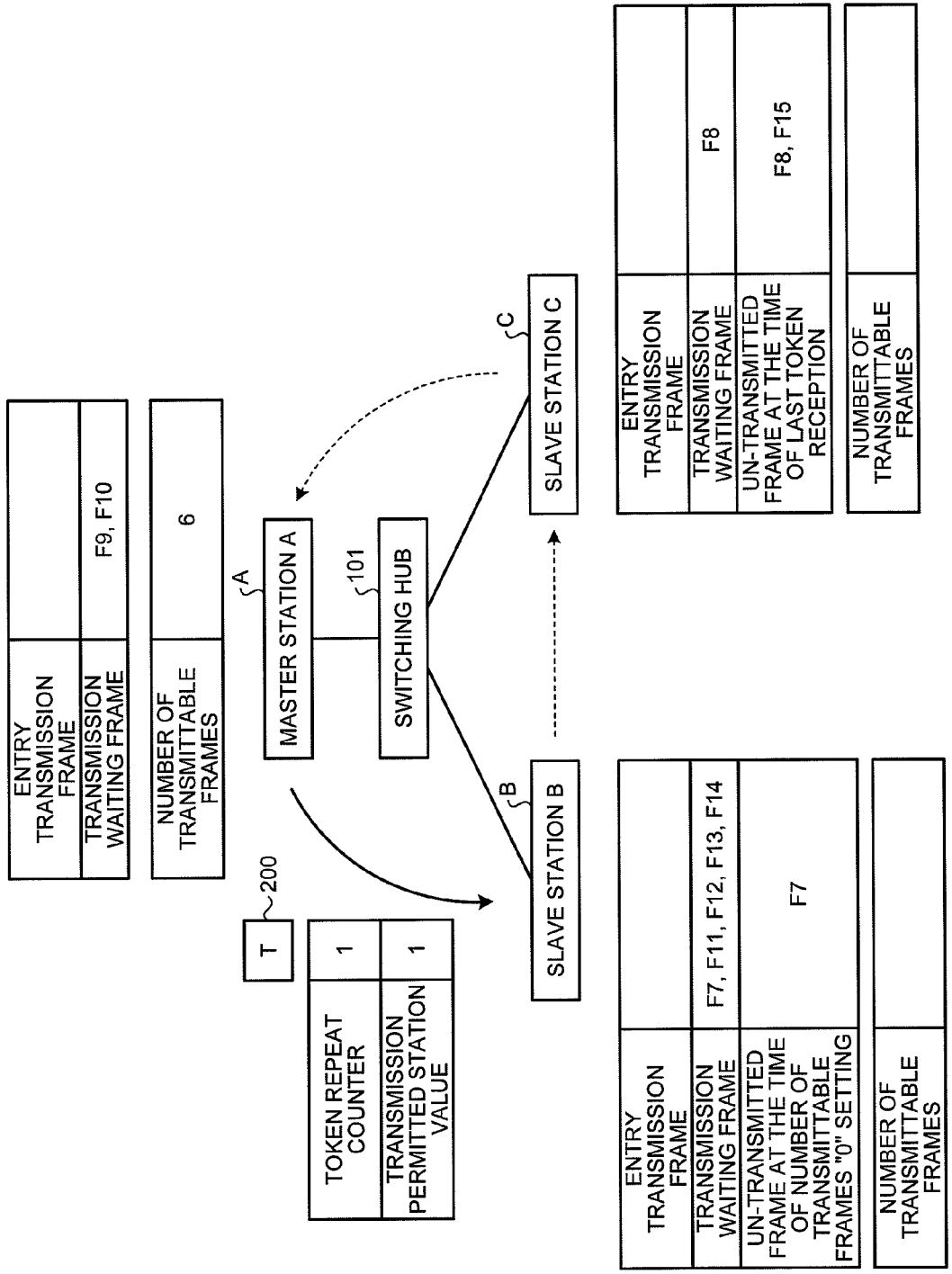

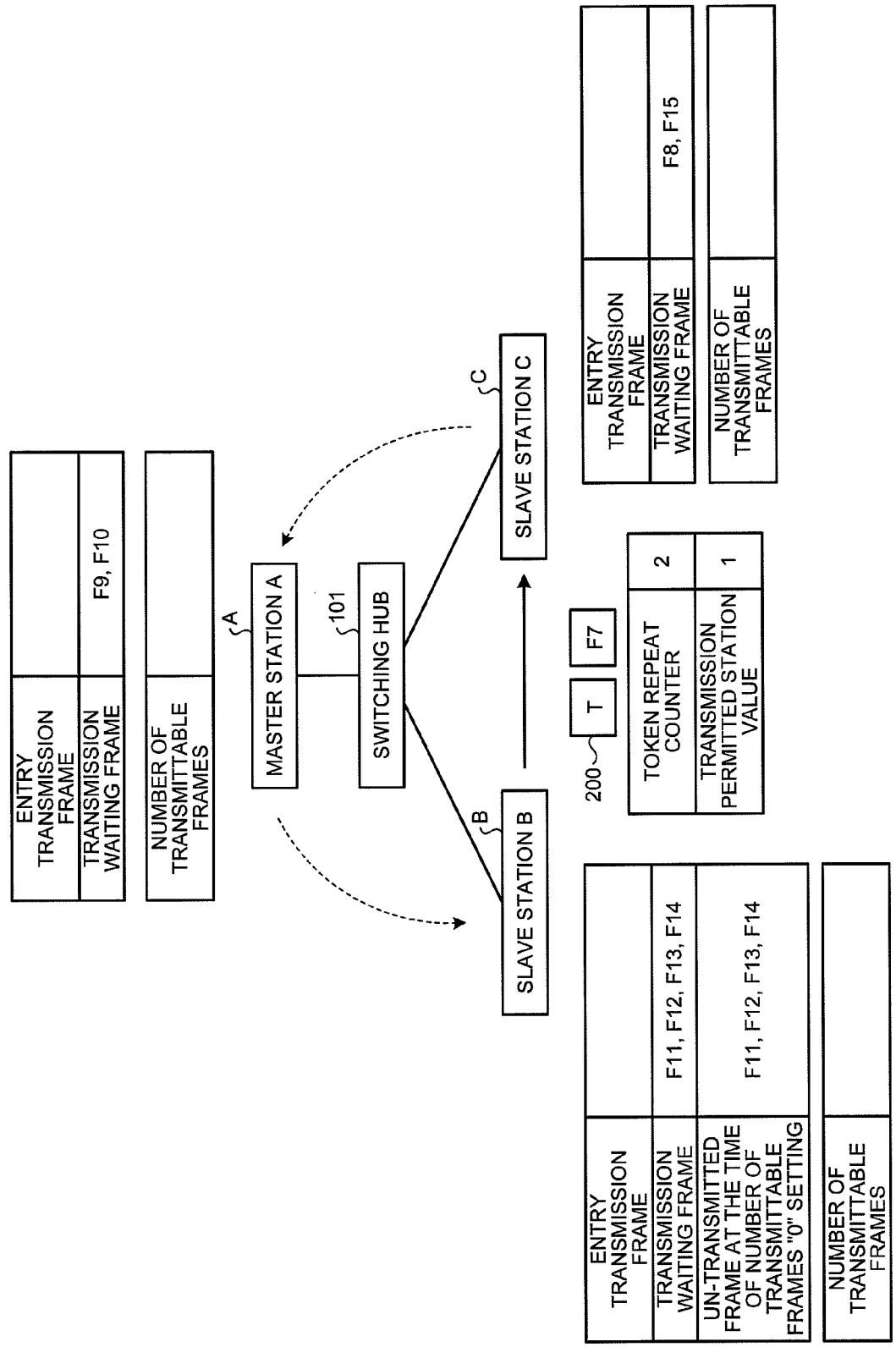

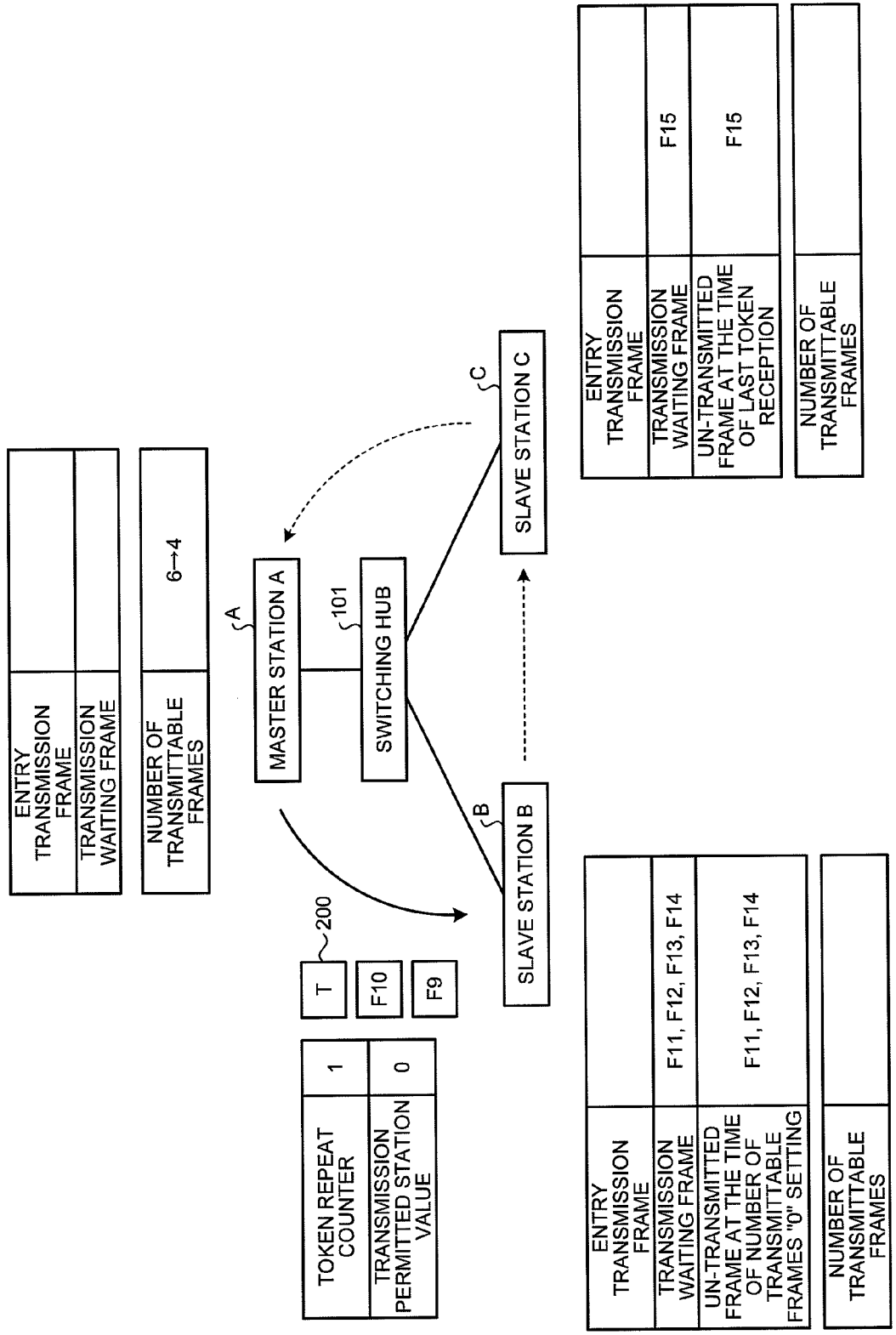

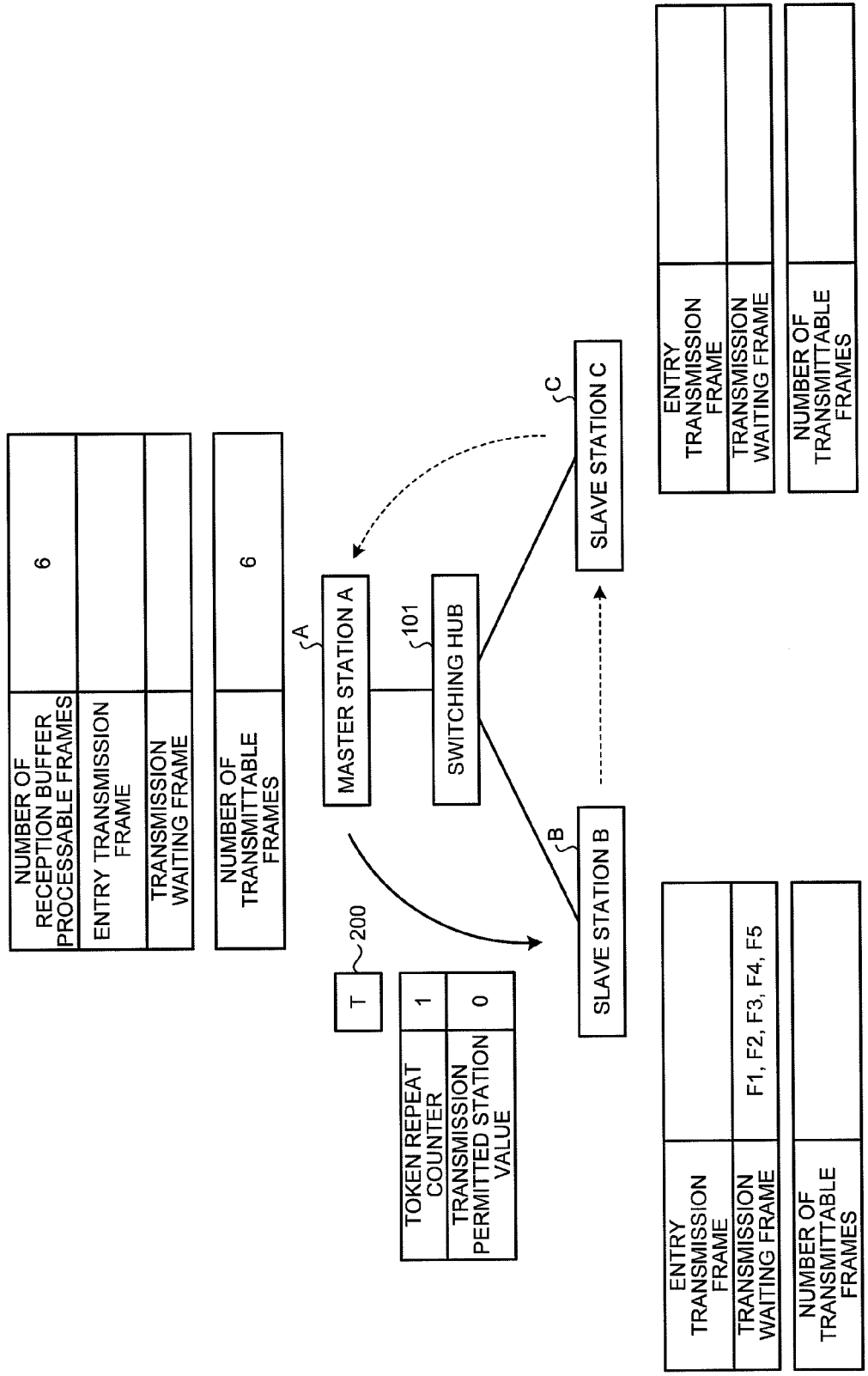

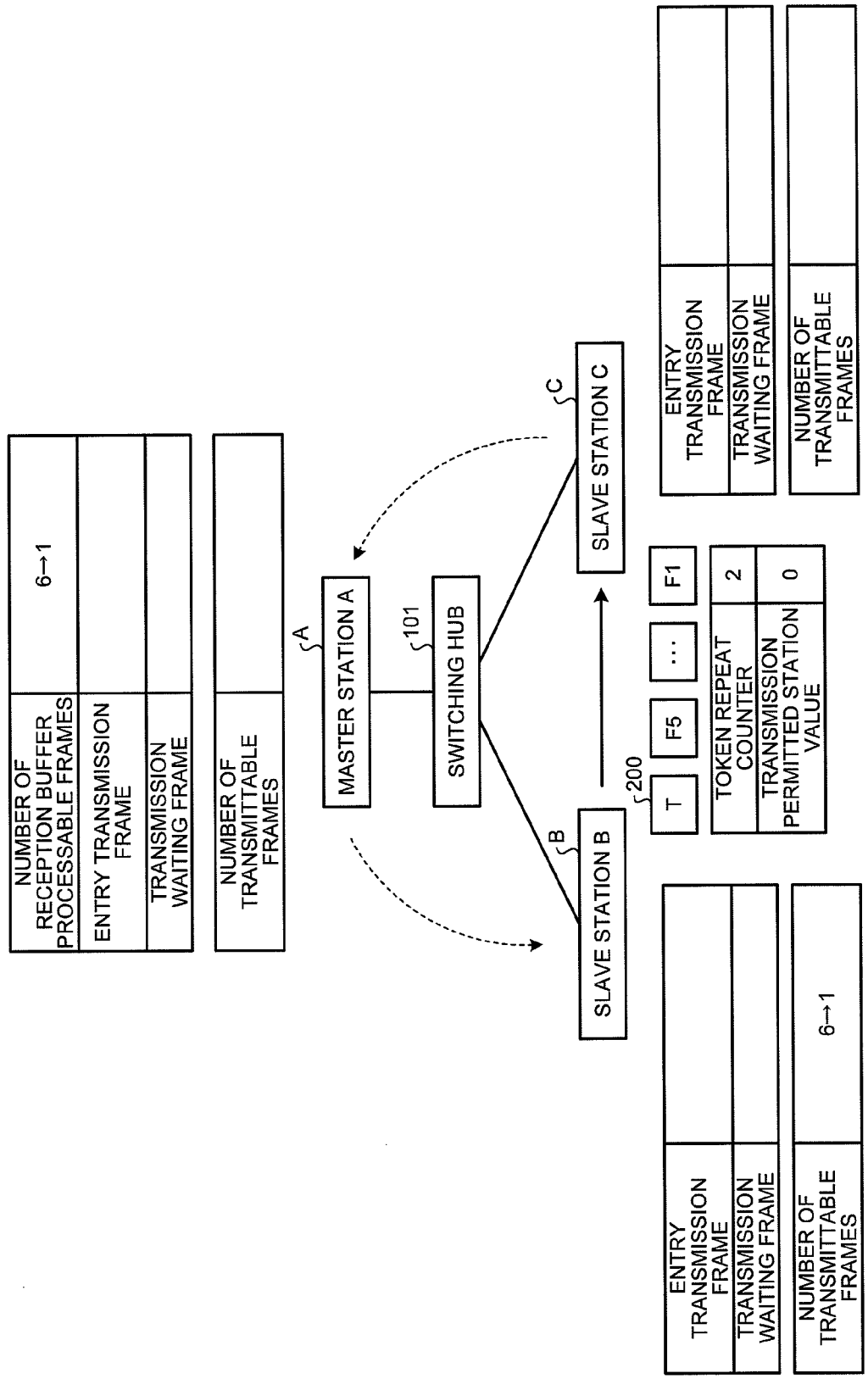

| COMMUNICATION NODE | STATION NUMBER | SEQUENCE NUMBER (CIRCULATION NUMBER OF TOKEN FRAME) |
|---|---|---|
| MASTER STATION A | 1 | 0 |
| SLAVE STATION B | 10 | 1 |
| SLAVE STATION C | 32 | 2 |
| SLAVE STATION D | 7 | 3 |
| SLAVE STATION E | 50 | 4 |
| . | . | . |
| . | . | . |
| . | . | . |
|  |  |  |
|  |  |  |

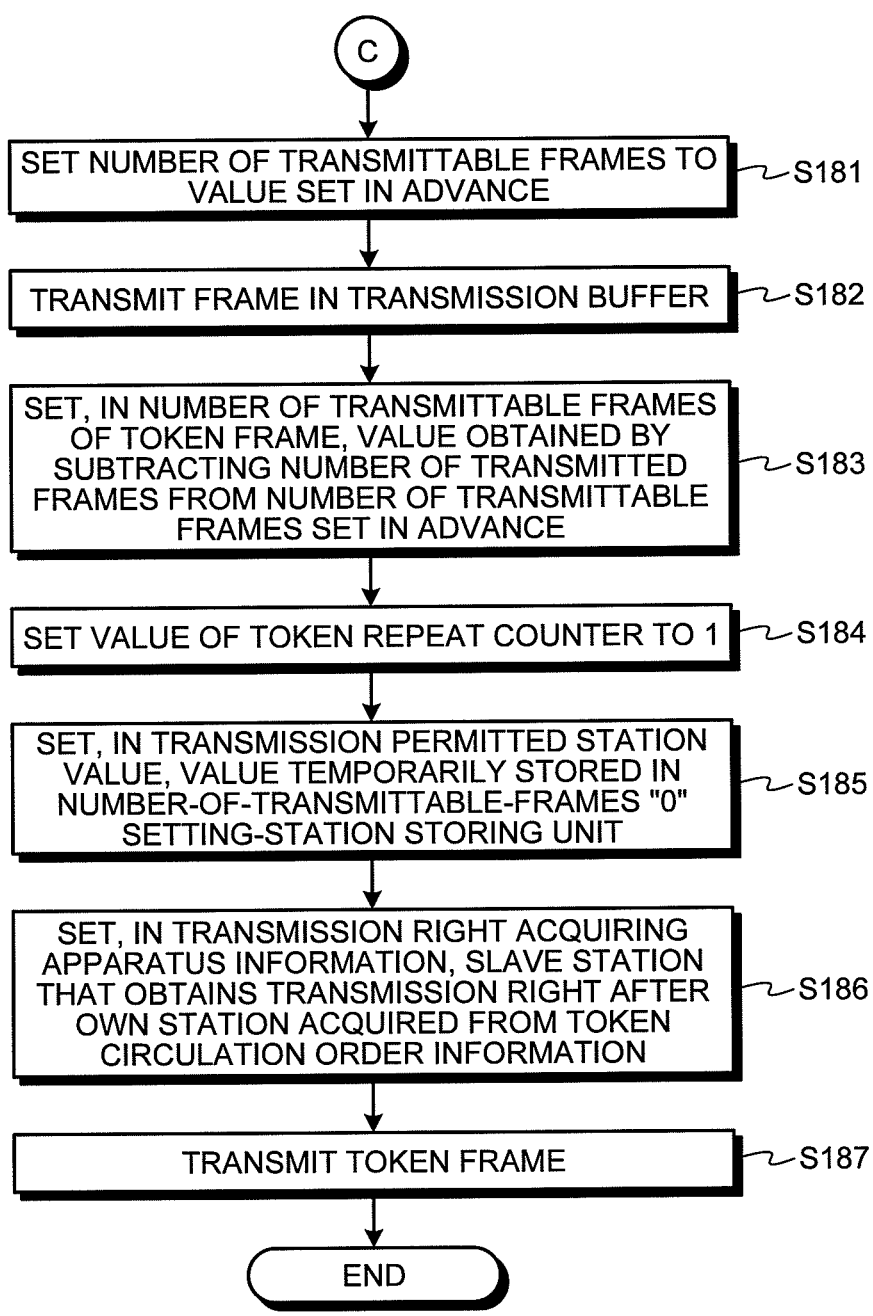

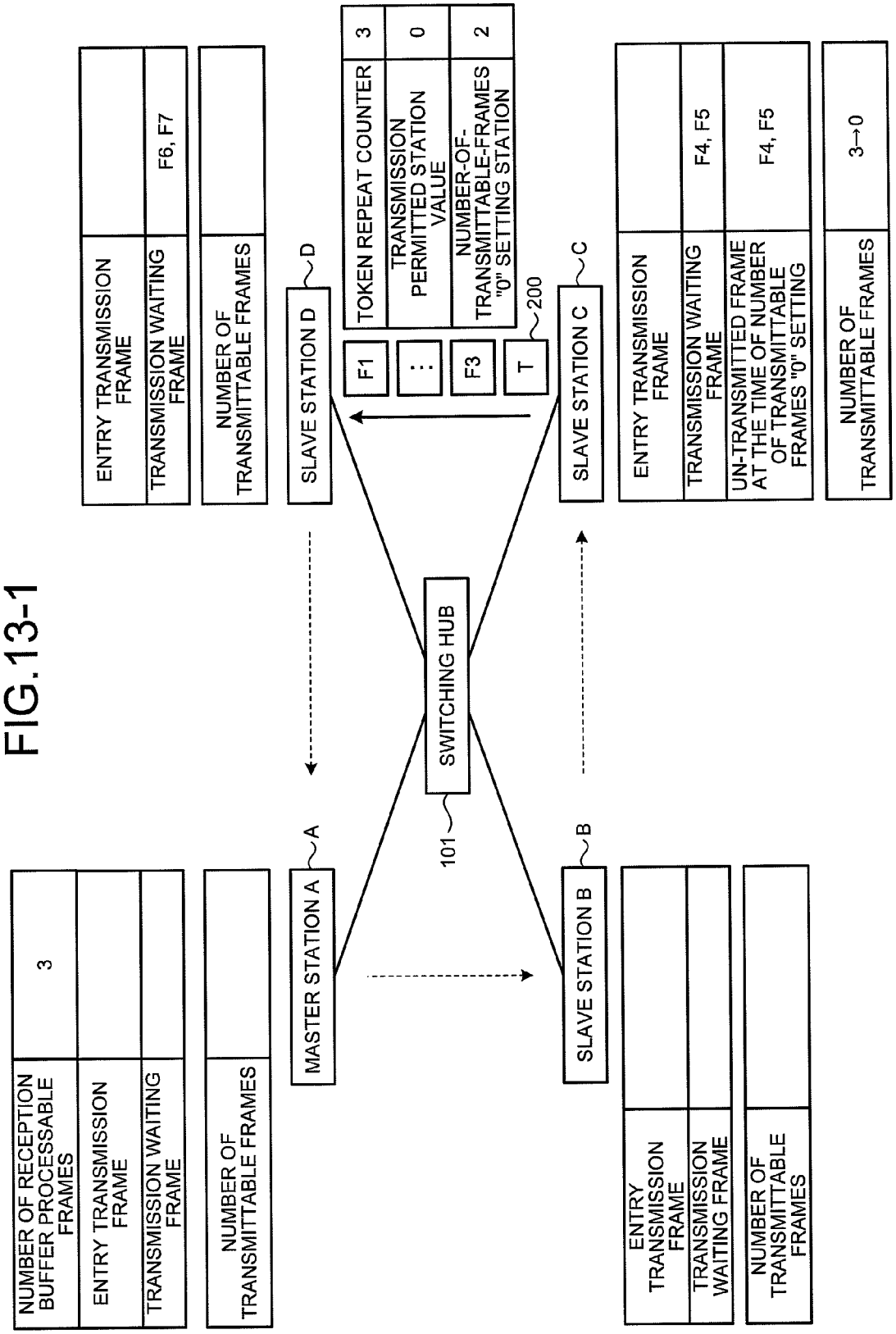

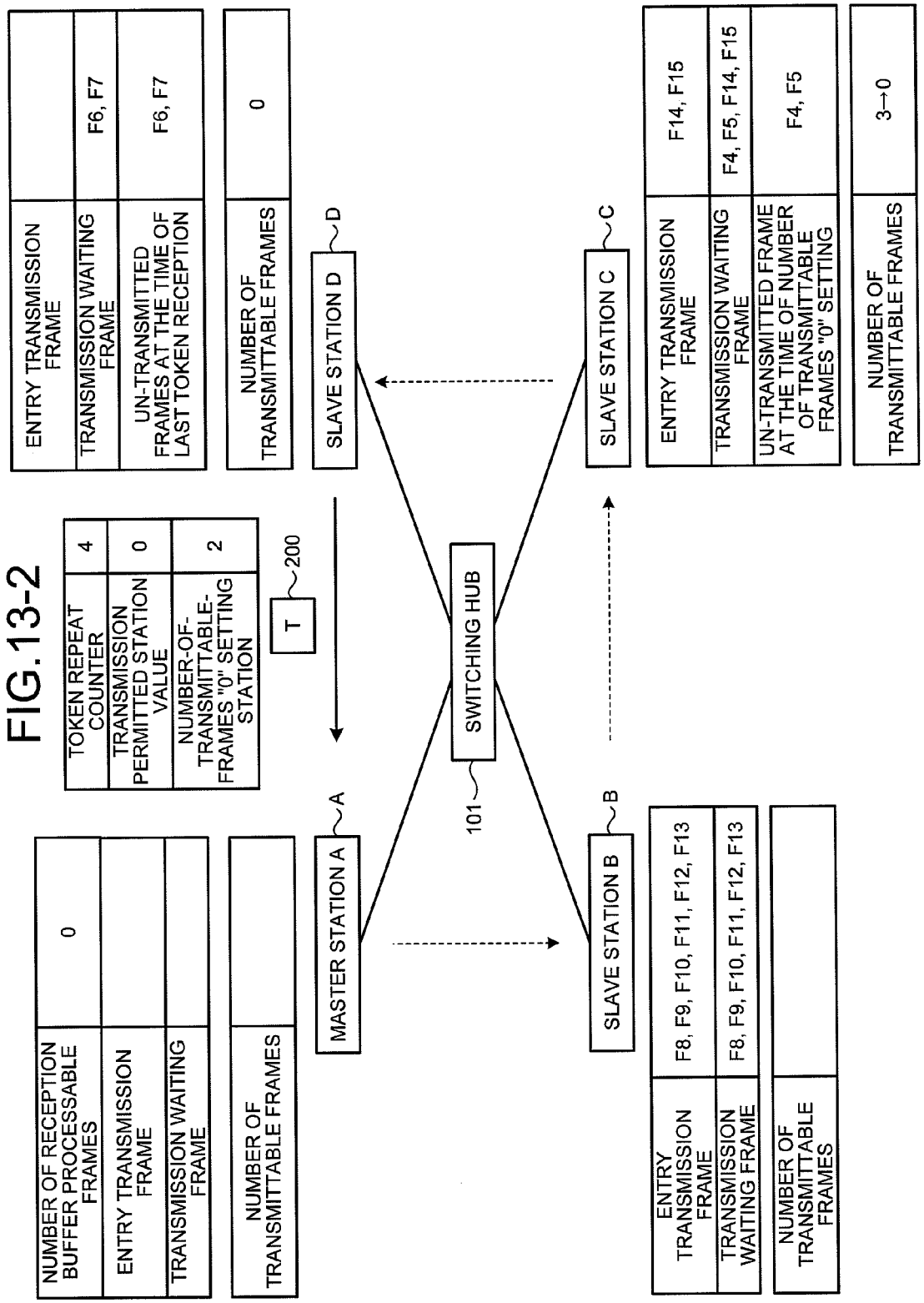

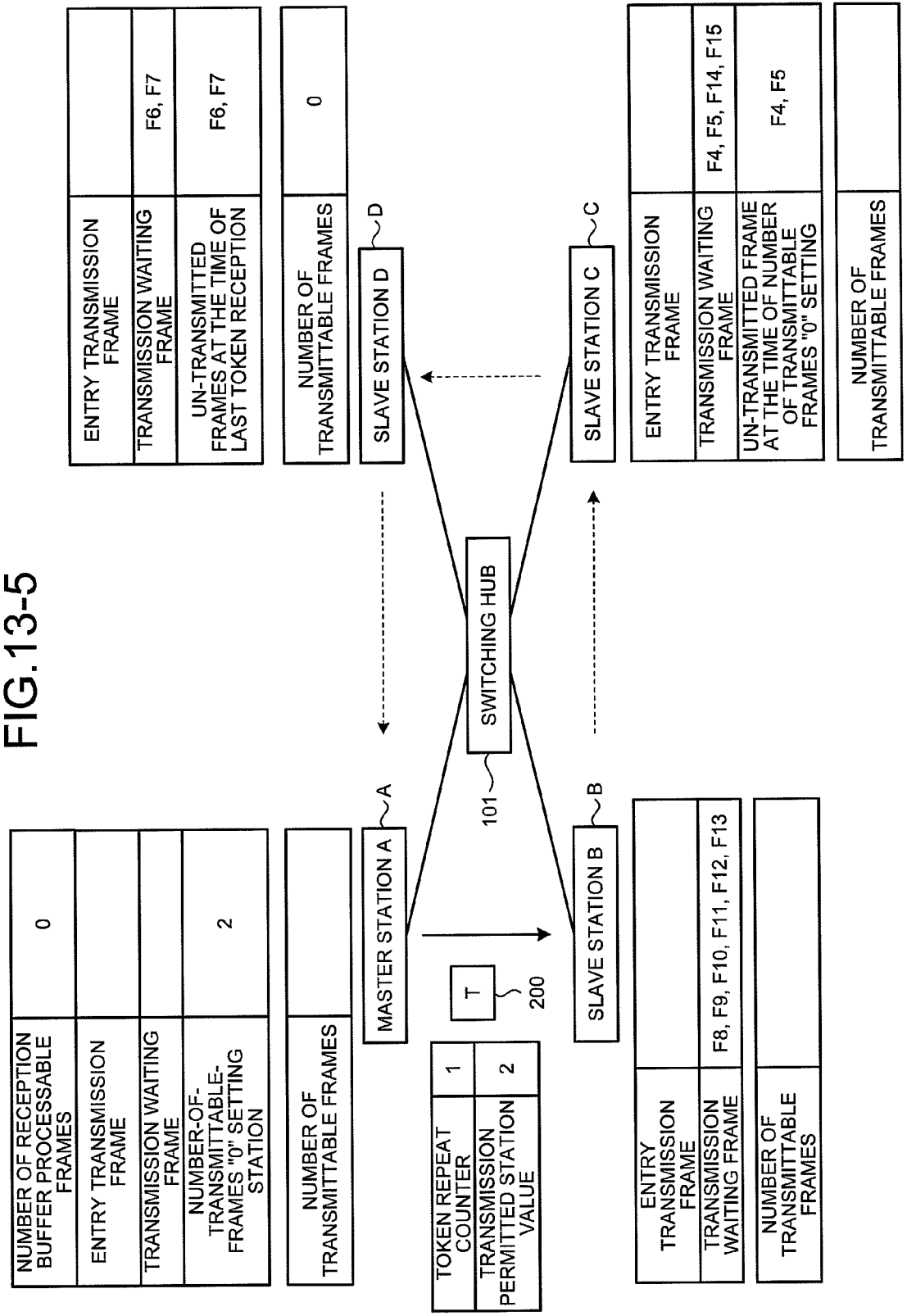

FIG.14

| DA | SA | type | FRAME TYPE INFORMATION (Token) | TRANSMISSION RIGHT ACQUIRING APPARATUS INFORMATION | TOKEN REPEAT COUNTER | START TRANSMISSION PERMITTED STATION VALUE | END TRANSMISSION PERMITTED STATION VALUE | NUMBER OF TRANSMITTABLE FRAMES | NUMBER-OF-TRANSMITTABLE-FRAMES "0" SETTING STATION | FCS |
|---|---|---|---|---|---|---|---|---|---|---|
| | | | | | | 208a | 208b | | | |
| | | | | DATA | | | | | | |

200, 204

COMMUNICATION MANAGEMENT APPARATUS, COMMUNICATION APPARATUS, AND COMMUNICATION METHOD

CROSS REFERENCE TO RELATED APPLICATIONS

This application is a National Stage of International Application No. PCT/JP2008/073639 filed Dec. 25, 2008, the contents of all of which are incorporated herein by reference in their entirety.

TECHNICAL FIELD

The present invention relates to a communication management apparatus, a communication apparatus, and a communication method for performing communication using a token frame among communication nodes connected by an Ethernet (registered trademark).

BACKGROUND ART

In the past, there is known a method of controlling, in a local area network in which a plurality of communication nodes are connected, transmission of data from the communication nodes using a token passing system for circulating a token frame that indicates a transmission right (see, for example, Patent Document 1). In the technology described in Patent Document 1, an allowed transmission data amount, which is an amount of data that can be transmitted while the token frame is circulated in a network once, is set in the token frame and, when an amount of data that should be transmitted by a communication node that has acquired the token frame is equal to or smaller than the allowed transmission data amount set in the token frame, after the data is transmitted, a token frame in which an amount of data obtained by subtracting the transmitted amount of data from the allowed transmission data amount is set as a new allowed transmission data amount is transmitted to the next communication node. When the amount of data that should be transmitted is larger than the allowed transmission data amount, the communication node transmits a token frame in which the allowed transmission data amount is set to 0 to the next node and memorizes that the allowed transmission data amount is set to 0. Even if communication nodes having turns of token circulation order after the turn of this communication node acquire the token frame, the communication nodes cannot transmit data because the allowed transmission data amount is "0". Thereafter, when a management station in the network receives the token frame in which the allowed transmission data amount is set to 0, the management station transmits a token frame in which the allowed transmission data amount is set to "−1". When the communication node that sets the allowed transmission data amount of the token frame received last time to "0" receives the token frame in which the allowed transmission data amount is set to "−1", the communication node obtains a transmission right of data, sets the allowed transmission data amount to an initial value, and transmits data that could not be transmitted last time.

Patent Document 1: Japanese Patent No. 3487324

DISCLOSURE OF INVENTION

Problem to be Solved by the Invention

However, in the communication method described in Patent Document 1, when a communication node that acquires a token frame transmits data, the communication node calculates an amount of data that should be transmitted and compare the calculated amount of data that should be transmitted and an allowed transmission data amount included in the token frame. Therefore, there is a problem in that time is required until the communication node transmits the data after acquiring the token frame.

In the method described in Patent Document 1, for example, a communication node that has received a token frame for the nth time but could not transmit data because an amount of data that should be transmitted is larger than the allowed transmission data amount can surely transmit data when the communication node acquires the token frame next for the (n+1)th time. However, after the reception of the nth token frame, when data that should be transmitted to this communication node is added anew while the token frame is circulated once, when the communication node acquires the token frame for the (n+1)th time, an amount of data obtained by adding the amount of the added data to an amount of data that should have been transmitted when the token frame has received for the nth time is transmitted. Therefore, there is also a problem in that, for example, when a communication node located on a downstream side of the communication node stores the data that should be transmitted when the token frame is received for the nth time, deviation occurs in time order of data that should be transmitted. As a result, the data cannot be transmitted among communication nodes on schedule subjected to transmission entry.

The present invention has been devised in view of the above and it is an object of the present invention to obtain, in a communication system that circulates a token frame in a network and performs communication, a communication management apparatus, a communication apparatus, and a communication method that can reduce, compared with the past, time required until a communication node transmits data after acquiring a token frame. It is also an object of the present invention to obtain a communication management apparatus, a communication apparatus, and a communication method that can transmit, generally in order of generation of data, the data transmitted by communication nodes included in the communication system.

Means for Solving Problem

In order to solve the aforementioned problems, a communication management apparatus that manages transmission of data in a network in which one communication management apparatus and one or more communication apparatuses are connected by an Ethernet (registered trademark) cable according to one aspect of the present invention is constructed in such a manner as to include: a token-circulation-order storing unit that stores token circulation order for circulating a token frame in the network; a token-frame receiving unit that determines whether transmission right acquiring apparatus information for acquiring a transmission right next in the received token frame indicates the own apparatus; a token-frame transmitting unit that transmits the token frame in which first transmission right acquisition determination information indicating a sequence number of a communication apparatus that can acquire the transmission right in the token circulation order, second transmission right acquisition determination information indicating a number of frames that can be transmitted while the token frame circulates once from the own apparatus, and transmission right acquiring apparatus information that indicates a next transmission destination of the token frame after the own apparatus acquired from the token circulation order are set; and a data-frame-communication processing unit that performs reception processing for data frames from other communication nodes and, when the transmission right is acquired, converts data into a data frame in frame unit and transmits the data frame.

Effect of the Invention

According to the present invention, when a communication node in a communication system transmits data, the communication management apparatus performs first determination for determining, according to first transmission right acquisition determination information, whether the communication node is a communication node that can transmit data and, when the communication node can transmit data, causes the communication node to transmit data within a range of the number of frames of second transmission right acquisition determination information. As a result, communication nodes only have to transmit, in frame unit, data accumulated in transmission buffers. Therefore, there is an effect that it is unnecessary to calculate an amount of data that can be transmitted and it is possible to reduce, compared with the past, time required until a communication node transmits data after acquiring the token frame. There is also an effect that, because transmission is carried out in transmission entry order, it is easy to perform feedback control used in a control apparatus.

BRIEF DESCRIPTION OF DRAWINGS

FIG. 2-1 is a schematic block diagram of a functional configuration of a master station.

FIG. 2-2 is a schematic block diagram of a functional configuration of a slave station.

FIG. 3 is a diagram of an example of a format of a token frame used in the first embodiment.

FIG. 4 is a schematic diagram of an example of a storage state of data in a transmission buffer.

FIG. 5-1 is a flowchart for explaining an example of transmission processing at the time of reception of the token frame in the slave station (first).

FIG. 5-2 is a flowchart for explaining the example of the transmission processing at the time of reception of the token frame in the slave station (second).

FIG. 7-1 is a schematic diagram for explaining an example of a communication method employing the token frame according to the first embodiment (first).

FIG. 7-2 is a schematic diagram for explaining the example of the communication method employing the token frame according to the first embodiment (second).

FIG. 7-3 is a schematic diagram for explaining the example of the communication method employing the token frame according to the first embodiment (third).

FIG. 7-4 is a schematic diagram for explaining the example of the communication method employing the token frame according to the first embodiment (fourth).

FIG. 7-5 is a schematic diagram for explaining the example of the communication method employing the token frame according to the first embodiment (fifth).

FIG. 7-6 is a schematic diagram for explaining the example of the communication method employing the token frame according to the first embodiment (sixth).

FIG. 7-7 is a schematic diagram for explaining the example of the communication method employing the token frame according to the first embodiment (seventh).

FIG. 7-8 is a schematic diagram for explaining the example of the communication method employing the token frame according to the first embodiment (eighth).

FIG. 7-9 is a schematic diagram for explaining the example of the communication method employing the token frame according to the first embodiment (ninth).

FIG. 8 is a flowchart for explaining an example of processing at the time of reception of a token frame by a master station.

FIG. 9-1 is a schematic diagram for explaining an example of a procedure of a communication method employing the token frame according to a second embodiment (first).

FIG. 9-2 is a schematic diagram for explaining the example of the procedure of the communication method employing the token frame according to the second embodiment (second).

FIG. 9-3 is a schematic diagram for explaining the example of the procedure of the communication method employing the token frame according to the second embodiment (third).

FIG. 9-4 is a schematic diagram for explaining the example of the procedure of the communication method employing the token frame according to the second embodiment (fourth).

FIG. 9-5 is a schematic diagram for explaining the example of the procedure of the communication method employing the token frame according to the second embodiment (fifth).

FIG. 9-6 is a schematic diagram for explaining the example of the procedure of the communication method employing the token frame according to the second embodiment (sixth).

FIG. 9-7 is a schematic diagram for explaining the example of the procedure of the communication method employing the token frame according to the second embodiment (seventh).

FIG. 9-8 is a schematic diagram for explaining the example of the procedure of the communication method employing the token frame according to the second embodiment (eighth).

FIG. 12-1 is a flowchart for explaining an example of a token frame processing procedure of the master station according to the third embodiment (first).

FIG. 12-2 is a flowchart for explaining the example of the token frame processing procedure of the master station according to the third embodiment (second).

FIG. 13-1 is a schematic diagram for explaining an example of token frame transmission processing according to the third embodiment (first).

FIG. 13-2 is a schematic diagram for explaining the example of the token frame transmission processing according to the third embodiment (second).

FIG. 13-3 is a schematic diagram for explaining the example of the token frame transmission processing according to the third embodiment (third).

FIG. 13-4 is a schematic diagram for explaining the example of the token frame transmission processing according to the third embodiment (fourth).

FIG. 13-5 is a schematic diagram for explaining the example of the token frame transmission processing according to the third embodiment (fifth).

FIG. 14 is a diagram of an example of a format of a token frame used in a fourth embodiment.

Figure 1:
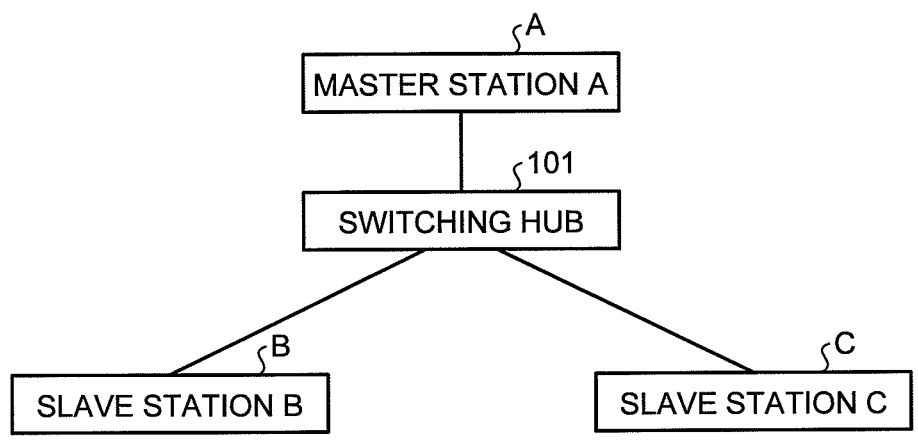
FIG. 1 is a schematic diagram of an example of the configuration of a communication system according to a first embodiment of the present invention.

EXPLANATIONS OF LETTERS OR NUMERALS 11-1, 11-2, 51-1, 51-2 Ports
20, 60 Communication processing units
21 Logical-ring configuring unit
22 Token-circulation-order-information storing unit
23, 62 Token-frame processing units
24, 63 Data-frame-communication processing units
25, 64 Transmission buffers
26, 65 Reception buffers
27 Changed-destination-information-during-priority-processing storing unit
28 Number-of-transmittable-frames "0" setting-station storing unit
30 Arithmetic processing unit
61 Token-circulation-destination-information storing unit
101 Switching hub
200 Token frame
201 Destination address (DA)
202 Transmission source address (SA)
203 Ethernet (registered trademark) type
204 Data
205 Frame type information
206 Transmission right acquiring apparatus information
207 Token repeat counter
208 Transmission permitted station value
208a Start transmission permitted station value
208b End transmission permitted station value
209 Number of transmittable frames
210 Number-of-transmittable-frames "0" setting station

BEST MODE(S) FOR CARRYING OUT THE INVENTION

Preferred embodiments of a communication management apparatus, a communication apparatus, and a communication method according to the present invention are explained in detail below with reference to the accompanying drawings. The present invention is not limited by these embodiments.

First Embodiment

FIG. 1 is a schematic diagram of an example of the configuration of a communication system according to a first embodiment of the present invention. This communication system includes a network of the same segment in which a plurality of communication nodes A to C are connected in a star shape by an Ethernet (registered trademark, the same applies in the following explanation) via a switching hub 101. The communication nodes A to C respectively have ports. The ports of the communication nodes are connected via a cable capable of performing full duplex communication such as a twist pair cable or an optical fiber. In this example, as the communication nodes, one master station A as a management station that manages transmission and reception of data (frames) in the network of the same segment and two slave stations B and C that perform transmission of data (frames) based on order of transmission by the master station A are provided. In this example, the communication system includes the communication nodes A to C connected in the star shape. However, the communication system can include communication nodes connected in another connection form such as a line shape or a ring shape. Connection forms of the star shape and the line shape can be mixed.

In the first embodiment, in the communication system in which the communication nodes A to C are connected by the Ethernet, the communication nodes A to C do not freely perform transmission of data. Instead, a frame for obtaining a data transmission right called token (a token frame) is transmitted in order to the communication nodes A to C in the communication system to enable a communication node, which acquires the token frame, to perform transmission of data to the other communication nodes. Transmission order of the token frame is as indicated by (1) below.

Master station A→slave station B→slave station C→master station A (1)

In this way, the communication system does not have a ring configuration in a physical network configuration. However, the data transmission right (the token frame) is circulated in order among the communication nodes A to C in the communication system to return the transmission right to the ring management station X, whereby the transmission right is repeated in a logical ring configuration.

Figures 1, 2:
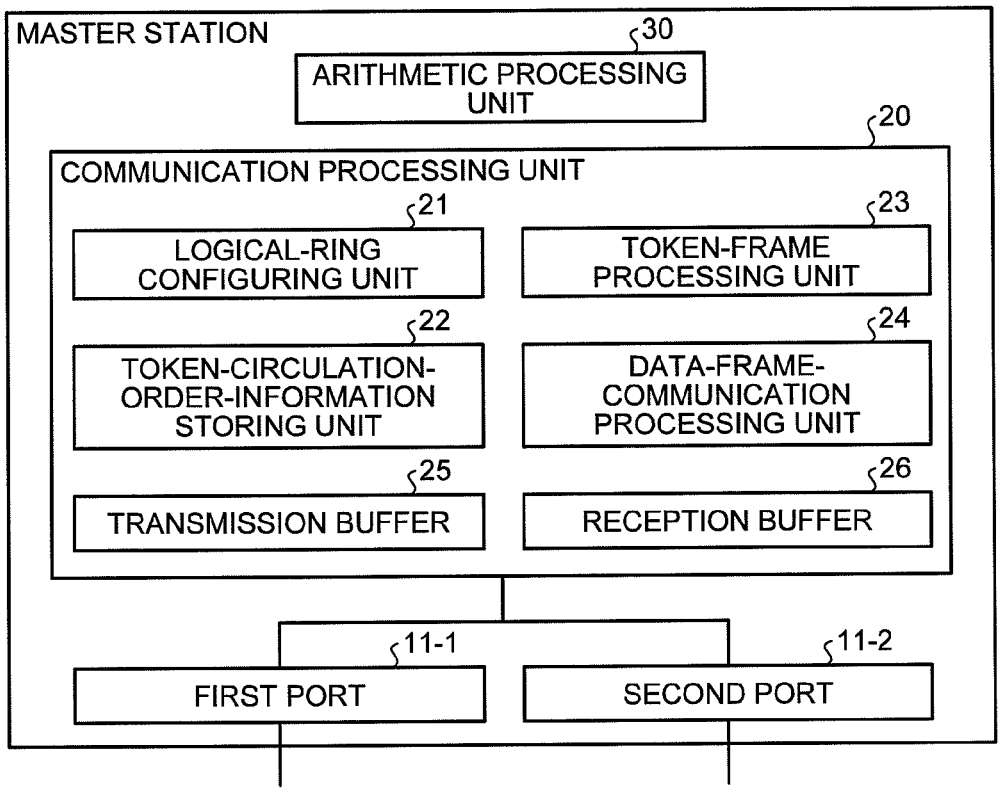
Figure 2:
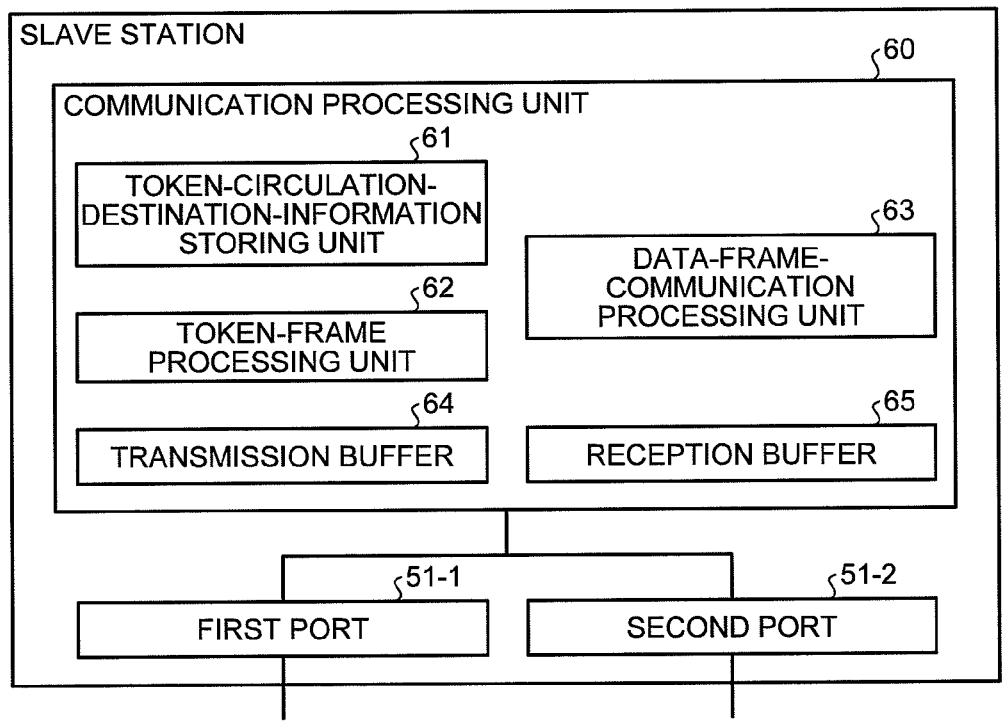

FIG. 2-1 is a schematic block diagram of a functional configuration of a master station. The master station includes two ports 11-1 and 11-2 for connecting an Ethernet cable between the master station and a communication node (a slave station) adjacent to the master station or between the master station and the switching hub 101, a communication processing unit 20 that performs, for example, transmission and reception processing for a frame via the ports 11-1 and 11-2 and processing for establishing transmission order of a token frame, and an arithmetic processing unit 30 that performs arithmetic processing using data from a slave station.

The ports 11-1 and 11-2 include two ports, i.e., a first port 11-1 and a second port 11-2. At least one of these two ports 11-1 and 11-2 only has to be connected to a port of the slave station adjacent to the master station (or connected to a port of a slave station via the switching hub 101).

The communication processing unit 20 includes a logical-ring configuring unit 21, a token-circulation-order-information storing unit 22, a token-frame processing unit 23, a data-frame-communication processing unit 24, a transmission buffer 25, and a reception buffer 26.

The logical-ring configuring unit 21 detects, during power-on of the master station or at every predetermined time, a communication node (a slave station) present in a network of the same segment as the master station and performs logical ring configuration processing for determining token circulation order information that is order for feeding (passing) a token frame, which is a data transmission right, from a connection relation between the master station and the communication nodes. The logical-ring configuring unit 21 notifies other communication nodes (slave stations) present in the network of the same segment of token circulation destination information including a communication node that obtains the transmission right after the communication node. This token circulation destination information can be token circulation order information.

The token-circulation-order-information storing unit 22 stores the token circulation order information determined by the logical-ring configuring unit 21.

Figures 3, 13:
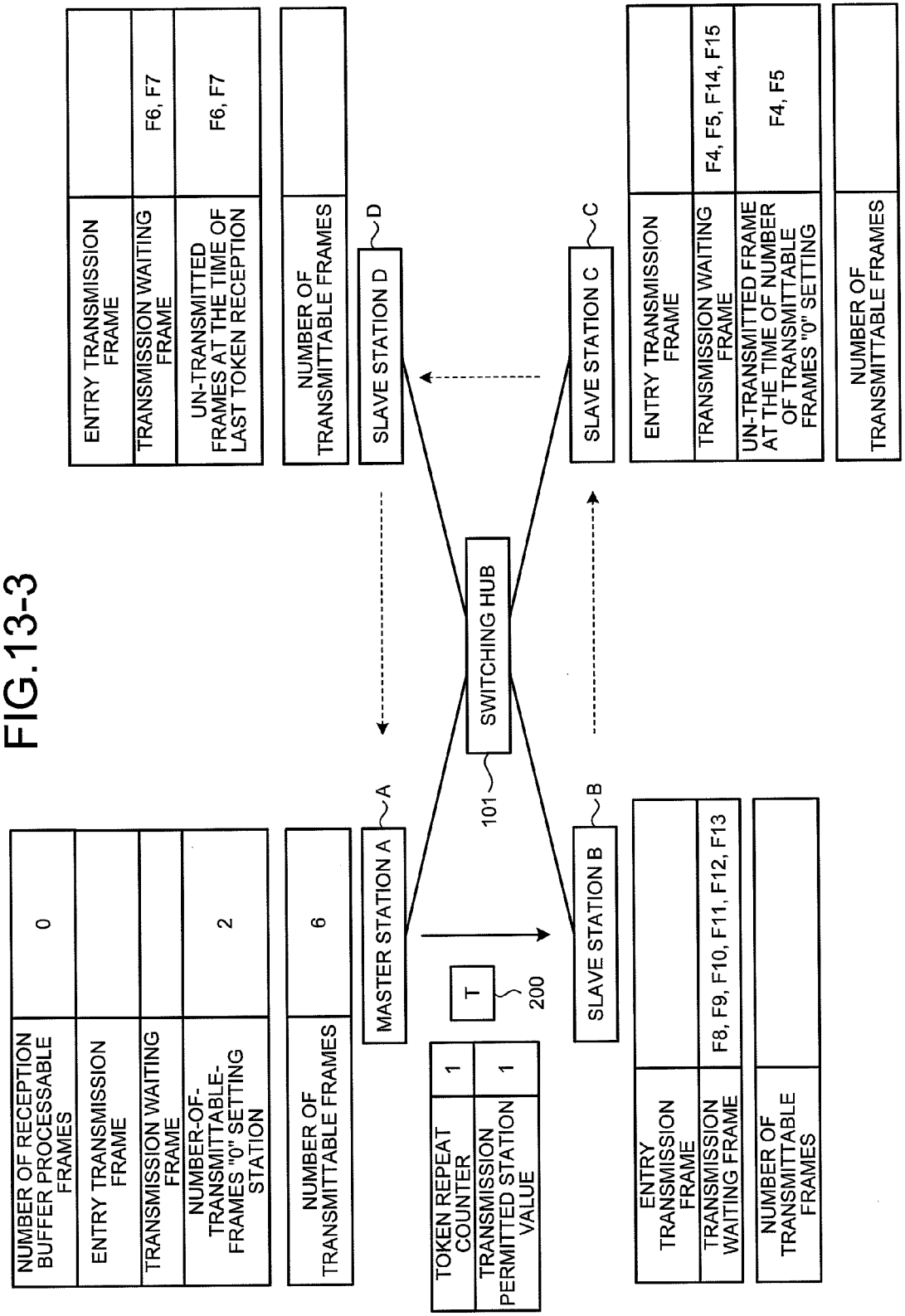
Figures 4, 13:
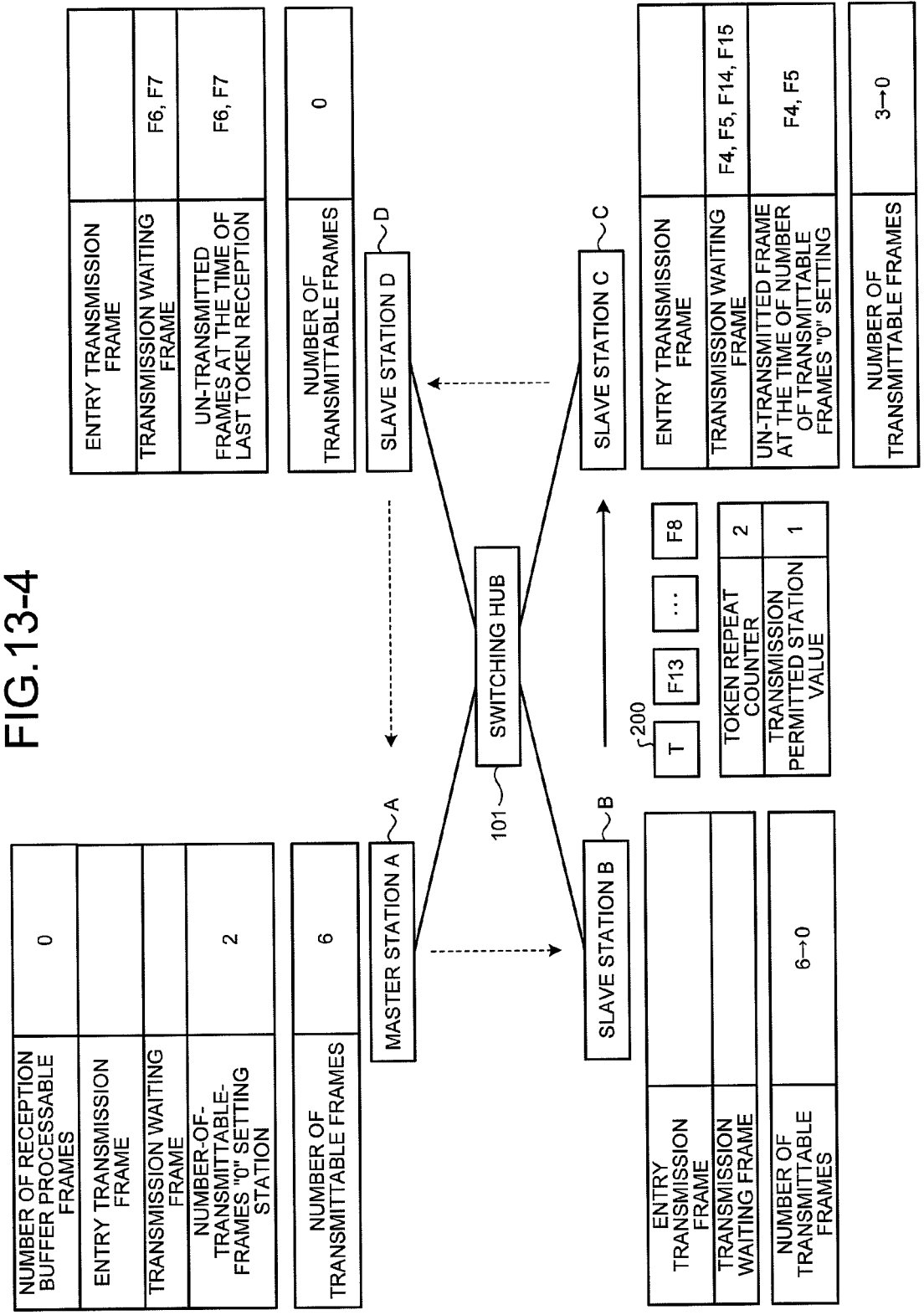

When the logical ring configuration processing by the logical-ring configuring unit 21 ends, the token-frame processing unit 23 generates a token frame, performs transmission processing for the token frame based on the token circulation order information, and, when the token frame is received, determines whether the transmission right is acquired. FIG. 3 is a diagram of an example of a format of the token frame used in the first embodiment. A token frame 200 is an Ethernet frame and has a destination MAC (Media Access Control) address (DA) 201, a transmission source MAC address (SA) 202, an Ethernet type (type) 203, a data 204 in which data of higher layers is stored, and an FCS (Frame Check Sequence) 211 that stores a result of check concerning whether there is an error in information stored in the DA 201 to the data 204 of the own frame.

In the first embodiment, frame type information 205, transmission right acquiring apparatus information 206, a token repeat counter 207, a transmission permitted station value 208, a number of transmittable frames 209, and a number-of-transmittable-frames "0" setting station 210 are stored in a part of the data 204.

Information indicating a type of an Ethernet frame is stored in the frame type information 205. In this case, information indicating that the frame is a token frame is stored. A MAC address of a communication node having a transmission right is stored in the transmission right acquiring apparatus information 206. This transmission right in the transmission right acquiring apparatus information 206 means a state in which it is possible to acquire the token frame and acquire the transmission right. The transmission right is not a right that makes it possible to actually perform transmission of data.

The token repeat counter 207 is a counter that counts a sequence number counted from the master station in a logical ring of a communication node that receives the token frame 200. The sequence number corresponds to a token circulation number in claims. The token repeat counter 207 indicates, with the master station set as a 0th communication node, in which position counted from the master station the communication node indicated by the transmission right acquiring apparatus information 206 is located on the logical ring. For example, when the communication nodes have the token circulation order of (1) above in the configuration shown in FIG. 1, the slave station B is a first communication node on the logical ring and the slave station C is a second communication node on the logical ring.

The transmission permitted station value 208 indicates a sequence number of a communication node that can transmit a data frame first among the communication nodes on the logical ring. This sequence number is the same as a value counted by the token repeat counter 207. The token repeat counter 207 and the transmission permitted station value 208 configure first transmission right acquisition determination information of claims.

The number of transmittable frames 209 represents a number of frames that can be transmitted while the token frame 200 is transmitted from the master station and circulates once. The number-of-transmittable-frames "0" setting station 210 indicates a sequence number of a communication node in which the number of transmittable frames 209 is set to "0". This sequence number is the same as a value counted by the token repeat counter 207.

Reception processing and transmission processing performed when such a token frame 200 is used are explained below. When the token-frame processing unit 23 receives the token frame 200 transmitted from another communication node (slave station), the token-frame processing unit 23 compares the transmission right acquiring apparatus information 206 in the data 204 of the token frame 200 and a MAC address of the own station. When the transmission right acquiring apparatus information 206 and the MAC address of the own station coincide with each other, the token-frame processing unit 23 determines that the communication node is in a state in which the communication node can transmit data. When the own station can transmit a data frame according to the information stored in the data 204, the token-frame processing unit 23 gives an instruction to the data-frame-communication processing unit 24 to perform transmission processing for a data frame. However, when the own station cannot transmit a data frame, the token-frame processing unit 23 determines that the transmission right could not be acquired. When the transmission right acquiring apparatus information 206 and the MAC address of the own station do not coincide with each other, the token-frame processing unit 23 determines that the transmission right is not obtained yet. In any case, the received token frame 200 is repeated to another port that is not a port where the token frame 200 is received. The reception processing from the token frame 200 by the token-frame processing unit 23 corresponds to token-frame receiving apparatus of claims.

When the token-frame processing unit 23 receives the token frame 200 in which the transmission right acquiring apparatus information 206 indicates the own station, the token-frame processing unit 23 sets the transmission right acquiring apparatus information 206, the token repeat counter 207, the transmission permitted station value 208, and the number of transmittable frames 209 and transmits the token frame 200 in broadcast. The token-frame processing unit 23 sets the token repeat counter 207 to "1", sets the number of transmittable frames 209 to a predetermined value decided in advance, and sets, as the transmission right acquiring apparatus information 206, (a MAC address of) a slave station that obtains, based on the token circulation order information, the transmission right after the own station.

When the number of transmittable frames 209 at the time of reception of a token frame is not "0", the token-frame processing unit 23 sets "0", which is sequence order of the own station in the logical ring, in the transmission permitted station value 208. When the number of transmittable frames 209 at the time of reception of a token frame is "0", the token-frame processing unit 23 sets a value stored in the number-of-transmittable-frames "0" setting station 210 of the token frame 200 at the reception point in the transmission permitted station value 208. The transmission processing for the token frame 200 by the token-frame processing unit 23 corresponds to a token-frame transmitting unit in claims.

The data-frame-communication processing unit 24 performs transmission and reception processing for a data frame. Specifically, the data-frame-communication processing unit 24 also has a function of, when the transmission right is acquired, converting data accumulated in the transmission buffer 25 into a data frame and transmitting the data frame to a slave station, subjecting a data frame accumulated in the reception buffer 26 from the slave station to reception processing, and transferring (repeating) a data frame addressed to another slave station by the slave station.

The transmission buffer 25 temporarily stores data frames calculated by the arithmetic processing unit 30 and transmitted to the other communication nodes by the data-frame-communication processing unit 24. The data frames are transmitted in order of the storage in the transmission buffer 25.

The reception buffer 26 temporarily stores data frames from the other communication nodes received in the ports 11-1 and 11-2. The reception buffer 26 stores data frames received in frame unit and can store only a predetermined number of frames.

The arithmetic processing unit 30 performs a predetermined arithmetic operation for generating information and the like at a predetermined cycle for controlling the other communication nodes using data from the other communication nodes subjected to reception processing by the data-frame-communication processing unit 24. An arithmetic processing result is transmitted to the other communication nodes via the data-frame-communication processing unit 24.

FIG. 2-2 is a schematic block diagram of a functional configuration of a slave station. The slave station includes two ports 51-1 and 51-2 for connecting an Ethernet cable between the slave station and a communication node (a ring management station or a slave station) adjacent to the slave station or between the slave station and the switching hub 101 and a communication processing unit 60 that performs transmission and reception processing for a frame via the ports 51-1 and 51-2.

As in the master station, the ports 51-1 and 51-2 include two ports, i.e., a first port 51-1 and a second port 51-2. At least one of these two ports 51-1 and 51-2 only has to be connected to a communication node.

The communication processing unit 60 includes a token-circulation-destination-information storing unit 61, a token-frame processing unit 62, a data-frame-communication processing unit 63, a transmission buffer 64, and a reception buffer 65.

The token-circulation-destination-information storing unit 61 stores token circulation destination information notified from the master station. It is assumed that only a MAC address of a communication node that obtains the transmission right after the own slave station is stored as token circulation destination information.

When the token-frame processing unit 62 receives the token frame 200 transmitted from another communication node, the token-frame processing unit 62 compares the transmission right acquiring apparatus information 206 in the data 204 of the token frame 200 and a MAC address of the own station (slave station). When the transmission right acquiring apparatus information 206 and the MAC address coincide with each other, the token-frame processing unit 62 determines that the slave station is in a state in which the slave station can perform transmission and compares a value of the token repeat counter 207 of the received token frame 200 and a value of the transmission permitted station value 208. When the token repeat counter 207 the transmission permitted station value 208, the token-frame processing unit 62 determines that the transmission right for a data frame has been obtained within the range of the number of transmittable frames 209. However, when the number of transmittable frames 209 is "0", the slave station cannot transmit a data frame. On the other hand, when the token repeat counter 207<the transmission permitted station value 208, the token-frame processing unit 62 determines that the transmission right for a data frame has not been obtained. When the transmission right acquiring apparatus information 206 and the MAC address of the own station do not coincide with each other, the token-frame processing unit 62 determines that the slave station is not in the state in which the slave station can perform transmission. The processing for receiving a token frame in the token-frame processing unit 62 corresponds to a token-frame receiving unit of claims.

The token-frame processing unit 62 sets, with respect to the received token frame 200, the transmission right acquiring apparatus information 206, the token repeat counter 207, and the number of transmittable frames 209 and sets the number-of-transmittable-frames "0" setting station 210 if necessary and transmits the token frame 200 in broadcast.

Specifically, the token-frame processing unit 62 sets the token repeat counter 207 obtained by incrementing the token repeat counter 207 stored in the token frame 200 by one and sets, as the transmission right acquiring apparatus information 206, the MAC address of the communication node set in the token circulation destination information.

When data frames are transmitted, the token-frame processing unit 62 sets, in the number of transmittable frames 209, a value obtained by subtracting the number of transmitted data frames from the number of transmittable frames 209 at the time of token frame reception. When the new number of transmittable frames 209 is "0", the token-frame processing unit 62 sets, as the number-of-transmittable-frames "0" setting station 210, a value of the token repeat counter 207 at the time of the token frame 200 reception. The processing for transmitting a token frame in the token-frame processing unit 62 corresponds to a token-frame transmitting unit of claims.

When the data transmission right is obtained, the data-frame-communication processing unit 63 performs transmission and reception processing for a data frame within a range specified by the number of transmittable frames 209. For example, in an FA network, the data-frame-communication processing unit 63 receives data transmitted from the master station and set in the slave station and transmits data used in arithmetic processing to the master station. The data-frame-communication processing unit 63 also has a function of receiving a data frame transmitted from the slave station and transferring (repeating) a data frame addressed to another slave station by the slave station.

The data-frame-communication processing unit 63 performs processing for distinguishing data (a frame) that could not be transmitted because the number of transmittable frames is "0" in the own station and data (a frame) that could not be transmitted because, although the token frame 200 is acquired, the number of transmittable frames is "0" from data accumulated in the transmission buffer 64 after the token frame 200 is released. This processing is explained later.

The transmission buffer 64 temporarily stores data entered in a data link layer from a not-shown application layer of the slave station until the data is transmitted by the data-frame-communication processing unit 63. The reception buffer 65 temporarily stores data received in the ports 51-1 and 51-2 until the data is subjected to reception processing by the data-frame-communication processing unit 63.

Figures 1, 9:
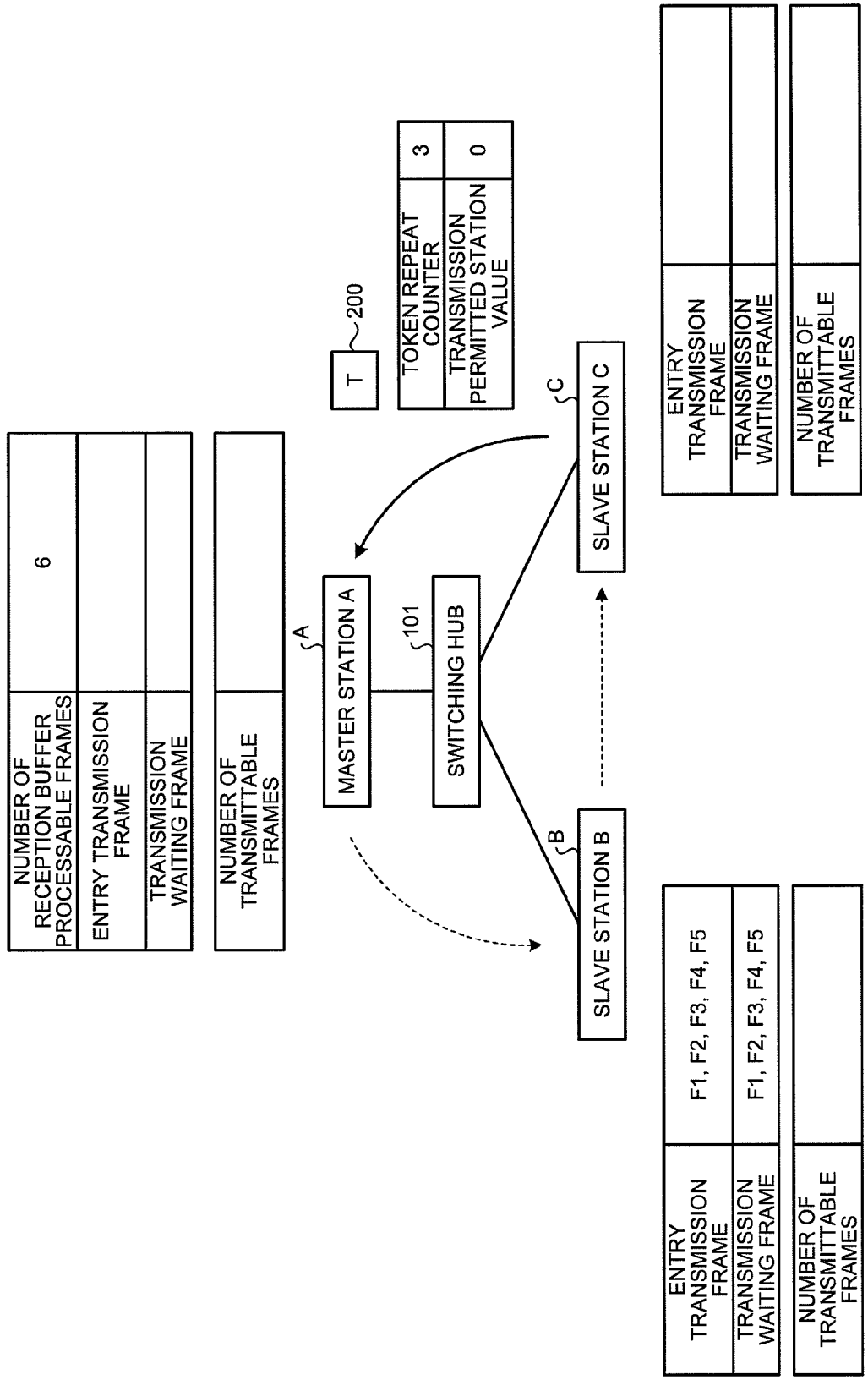
Figures 4, 9:
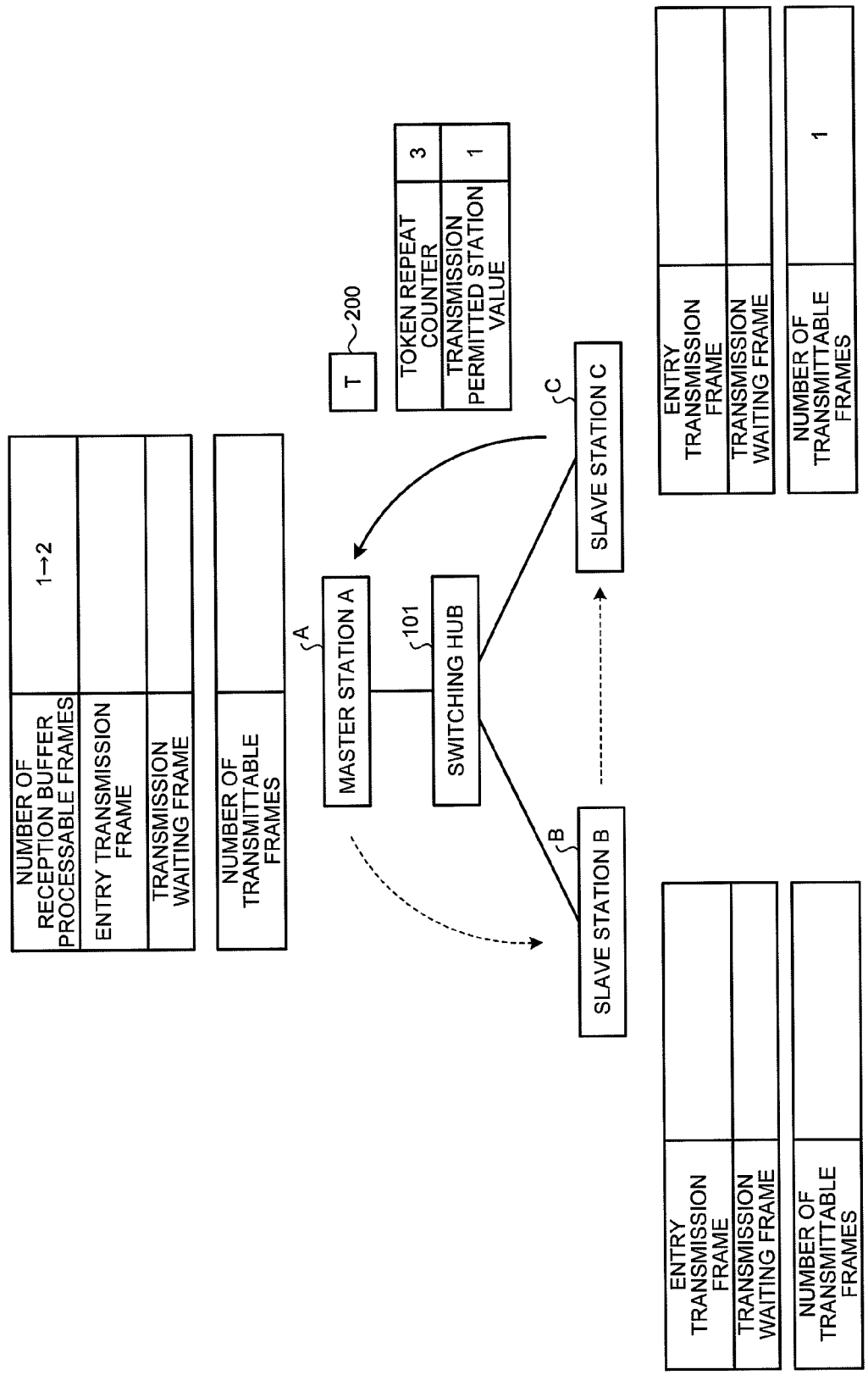
Figures 5, 9:
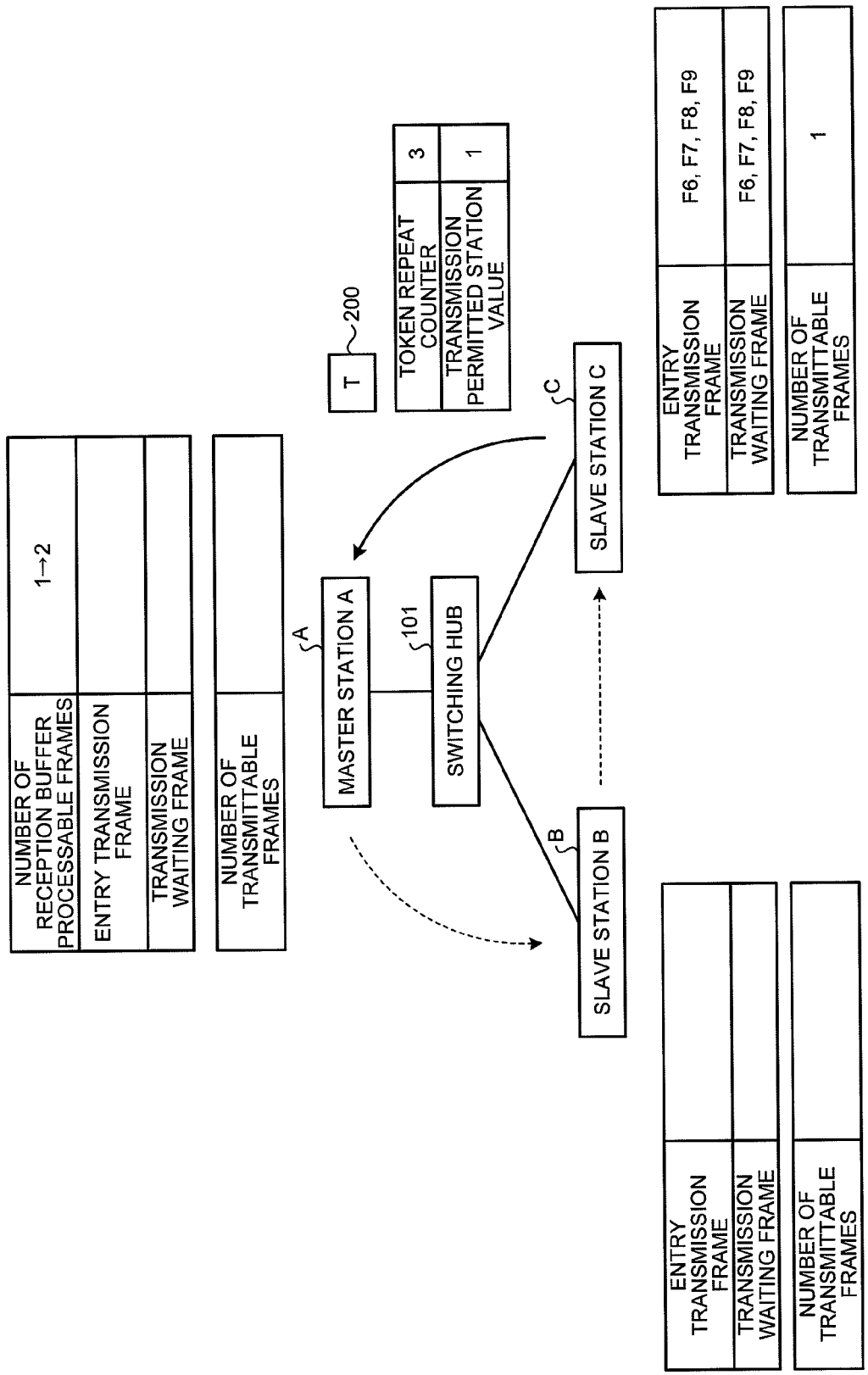
Figures 6, 9:
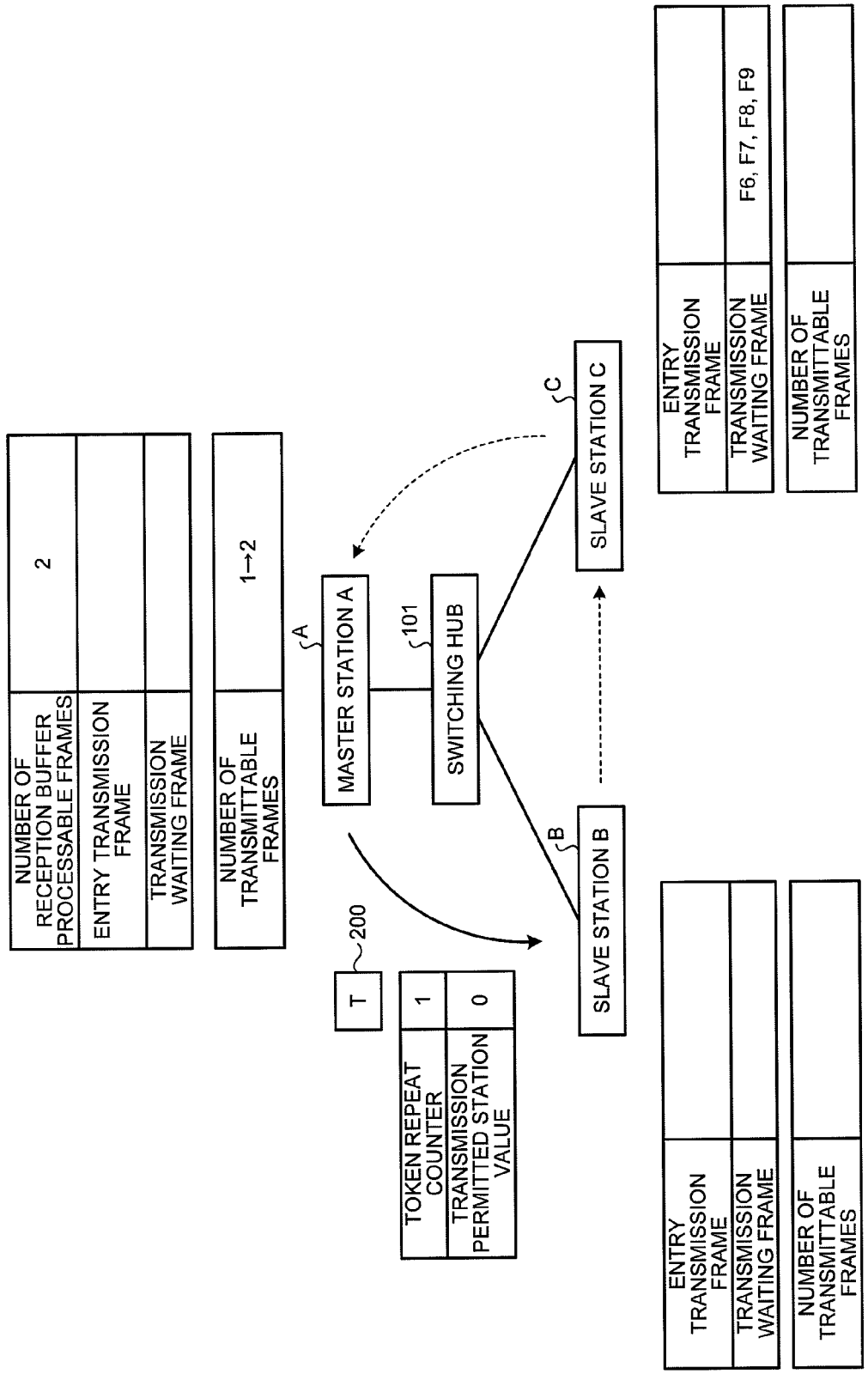
Figures 7, 9:
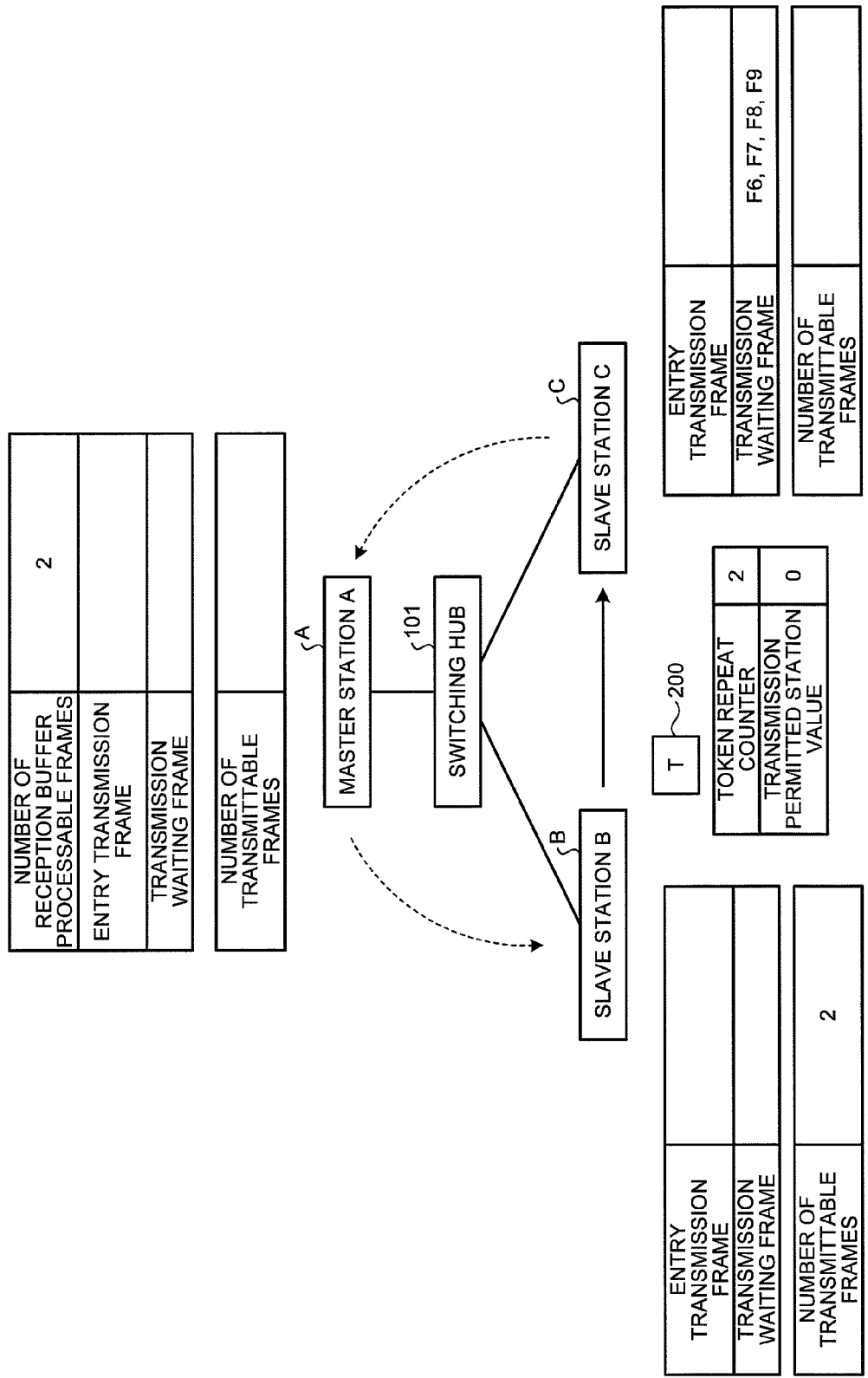
Figures 8, 9:
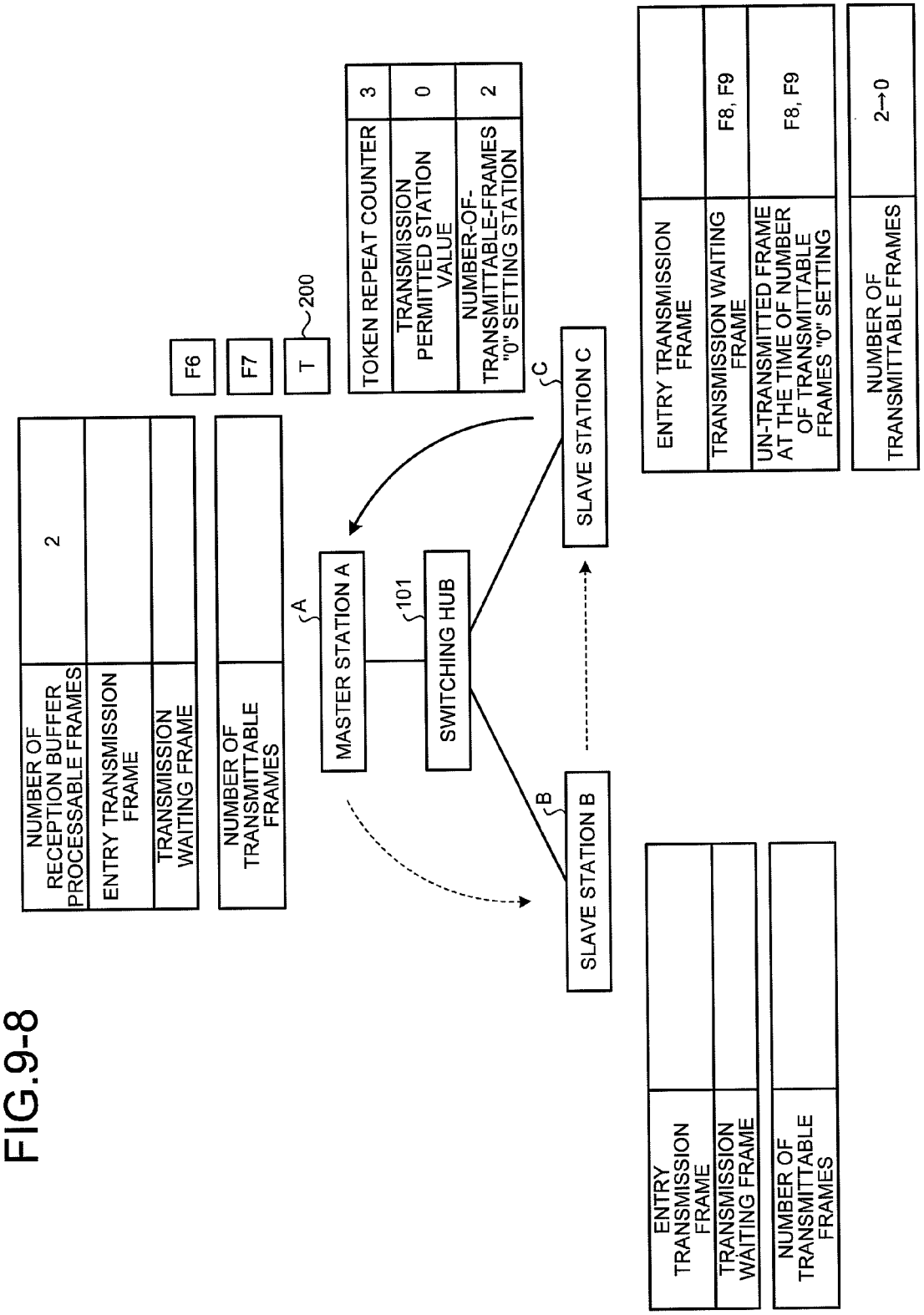

FIG. 4 is a schematic diagram of an example of a storage state of data in a transmission buffer. As shown in the figure, in the transmission buffer, data that should be transmitted to other communication nodes (mainly, the master station) is accumulated in time series as transmission waiting frames. Information for distinguishing data (a frame) that, although the transmission right was acquired, was not able to be transmitted is stored with respect to the respective transmission waiting frames. In this embodiment, the transmission buffer has un-transmitted frame information at the time of number of transmittable frames "0" setting for identifying, when the number of transmittable frames 209 in the own station is "0", data (a frame) that could not be transmitted and non-transmitted frame information at the time of last token reception for identifying data (a frame) that could not be transmitted because the transmission right was not obtained (i.e., the number of transmittable frames 209 is "0"). The un-transmitted frame information at the time of number of transmittable frames "0" setting and the un-transmitted frame information at the time of last token reception correspond to last-time un-transmitted data identification information of claims.

Figures 1, 5:
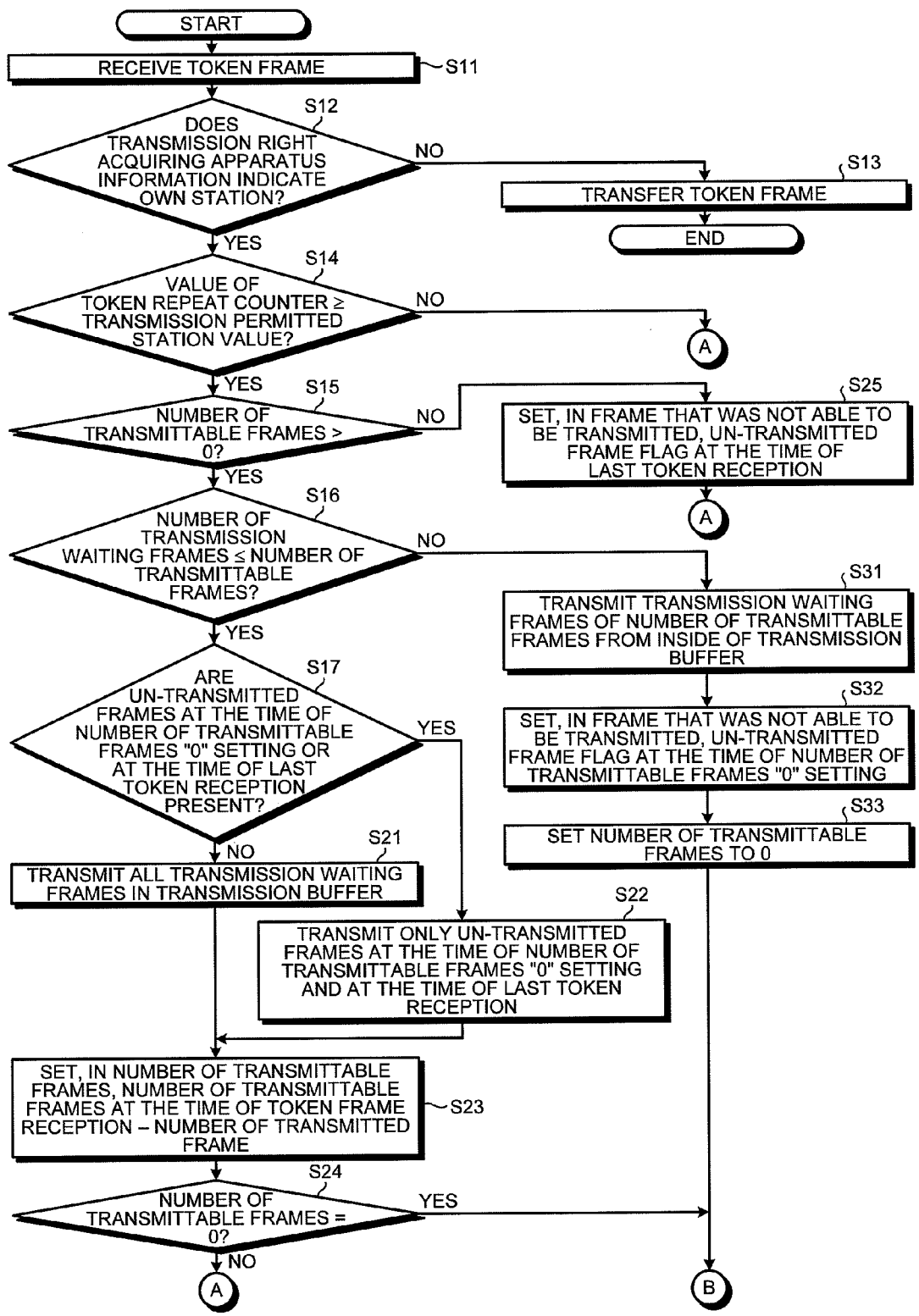
Figures 2, 5:
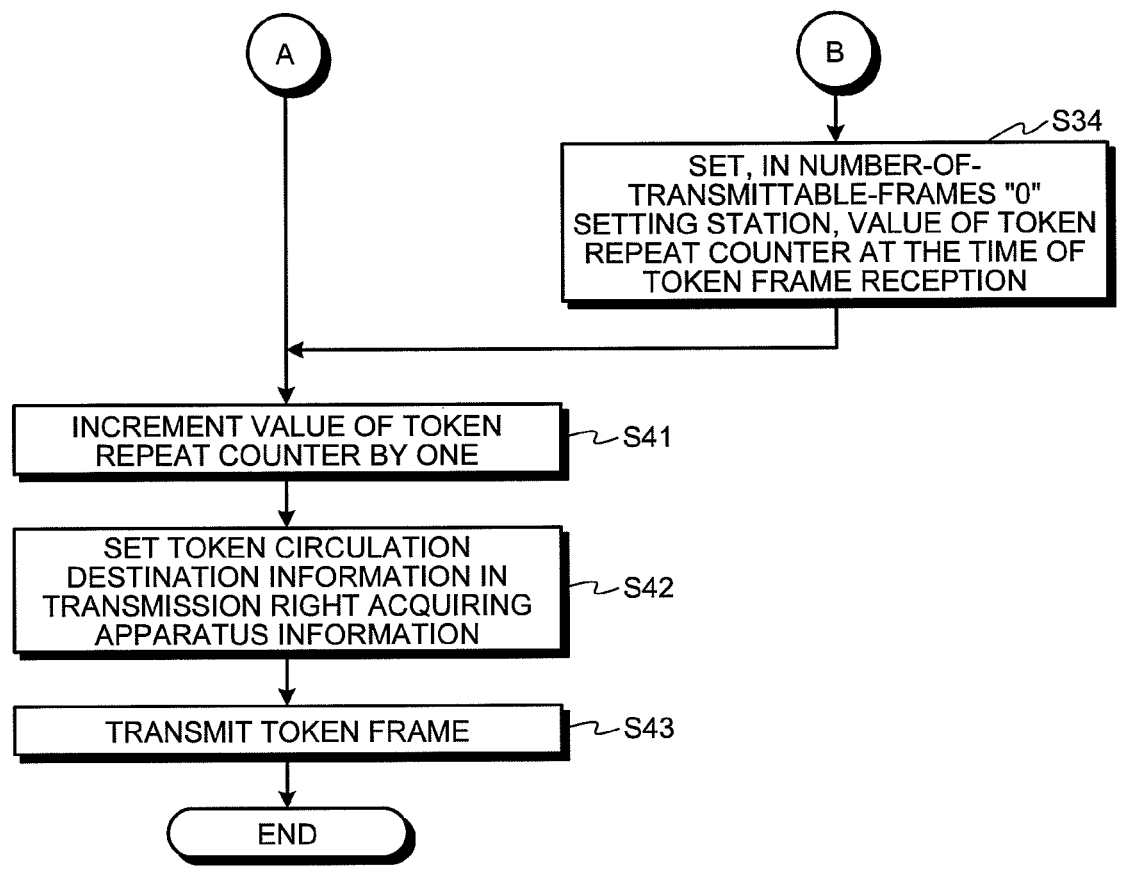

Processing at the time of token frame reception is explained below in order of the slave station and the master station. FIGS. 5-1 and 5-2 are flowcharts for explaining an example of transmission processing at the time of token frame reception in the slave station.

First, when the token-frame processing unit 62 receives the token frame 200 (step S11), the token-frame processing unit 62 determines whether the transmission right acquiring apparatus information 206 of the token frame 200 indicates the own station (step S12). When the transmission right acquiring apparatus information 206 does not indicate the own station (No at step S12), the token-frame processing unit 62 transfers the token frame (step S13) and the processing ends.

When the transmission right acquiring apparatus information 206 indicates the own station (Yes at step S12), the token-frame processing unit 62 determines whether a value of the token repeat counter 207 of the received token frame 200 is equal to or larger than the transmission permitted station value 208 (step S14). When the value of the token repeat counter 207 is equal to or larger than the transmission permitted station value 208 (Yes at step S14), the token-frame processing unit 62 further determines whether the number of transmittable frames 209 of the token frame 200 is larger than "0" (step S15).

When the number of transmittable frames 209 is larger than "0" (Yes at step S15), the token-frame processing unit 62 recognizes that the slave station has acquired the transmission right. The token-frame processing unit 62 determines whether the number of frames stored in the transmission buffer 64 at a point when the token frame 200 is received (hereinafter referred to as number of transmission waiting frames) is equal to or smaller than the number of transmittable frames (step S16). When the number of transmission waiting frames is equal to or smaller than the number of transmittable frames (Yes at step S16), the token-frame processing unit 62 further determines whether an un-transmitted frame at the time of number of transmittable frames "0" setting or an un-transmitted frame at the time of last token reception is present in the transmission buffer 64 (step S17).

When an un-transmitted frame at the time of number of transmittable frames "0" setting or an un-transmitted frame at the time of last token reception is not present in the transmission buffer 64 (No at step S17), the token-frame processing unit 62 performs transmission processing for all frames stored in the transmission buffer (step S21). When an un-transmitted frame at the time of number of transmittable frames "0" setting or an un-transmitted frame at the time of last token reception is present in the transmission buffer 64 (Yes at step S17), the data-frame-communication processing unit 63 transmits only the un-transmitted frame at the time of number of transmittable frames "0" setting or the un-transmitted frame at the time of last token reception (step S22).

Thereafter, the token-frame processing unit 62 sets (the number of transmittable frames 209 at the time of token frame 200 reception)–(the number of frames transmitted at step S21 or S22) in the number of transmittable frames 209 of the token frame 200 (step S23). Subsequently, the token-frame processing unit 62 determines whether a new number of transmittable frames 209 set in the token frame 200 is "0" (step S24).

When the set number of transmittable frames 209 is not "0" (No at step S24), the token-frame processing unit 62 increments the value of the token repeat counter 207 of the token frame 200 by one (step S41) and sets, in the transmission right acquiring apparatus information 206, token circulation destination information stored in the token-circulation-destination-information storing unit 61 (step S42). The token-frame processing unit 62 transmits the token frame 200 in which the items in the data 204 are set as explained above (step S43) and ends the processing.

When the number of transmittable frames 209 set at step S23 is 0 (Yes at step S24), the token-frame processing unit 62 sets, in the number-of-transmittable-frames "0" setting station 210 of the token frame 200, the value of the token repeat counter 207 at the time of the token frame 200 reception (step S34). Thereafter, the processing at step S41 and subsequent steps is performed.

On the other hand, when the number of transmission waiting frames is larger than the number of transmittable frames 209 at step S16 (No at step S16), the data-frame-communication processing unit 63 transmits the frames of the number of transmittable frames 209 stored in the transmission buffer 64 in order from a frame stored earliest (step S31). At this point, the token-frame processing unit 62 sets, in non-transmitted frames among the frames stored in the transmission buffer 64, a flag for identifying un-transmitted frame at the time of number of transmittable frames "0" setting (step S32). The token-frame processing unit 62 sets "0", i.e., (the number of transmittable frames 209 at the time of the token frame 200 reception)–(the number of frames transmitted at step S31) in the number of transmittable frames 209 of the token frame 200 (step S33) and sets the number of transmittable frames 209 of the token frame 200 to "0". Thereafter, the processing at step S34 and subsequent steps is performed.

When the number of transmittable frames 209 is "0" at step S15 (No at step S15), the token-frame processing unit 62 recognizes that the transmission right has not been obtained. The data-frame-communication processing unit 63 sets, in the frames stored in the transmission buffer 64 at the point when the token frame 200 is received, a flag for identifying an un-transmitted frame at the time of last token reception (step S25). Thereafter, the processing at step S41 and subsequent steps is performed.

When the value of the token repeat counter 207 is smaller than the transmission permitted station value 208 at step S14 (No at step S14), the token-frame processing unit 62 of the slave station recognizes that the transmission right has not been obtained. The processing at step S41 and subsequent steps is performed. As explained above, the processing of a token frame by the slave station is performed.

The processing at steps S34 to S42 are setting processing for information in the data 204 of the token frame 200. Therefore, order of setting is not limited to the order explained above.

Figure 6:
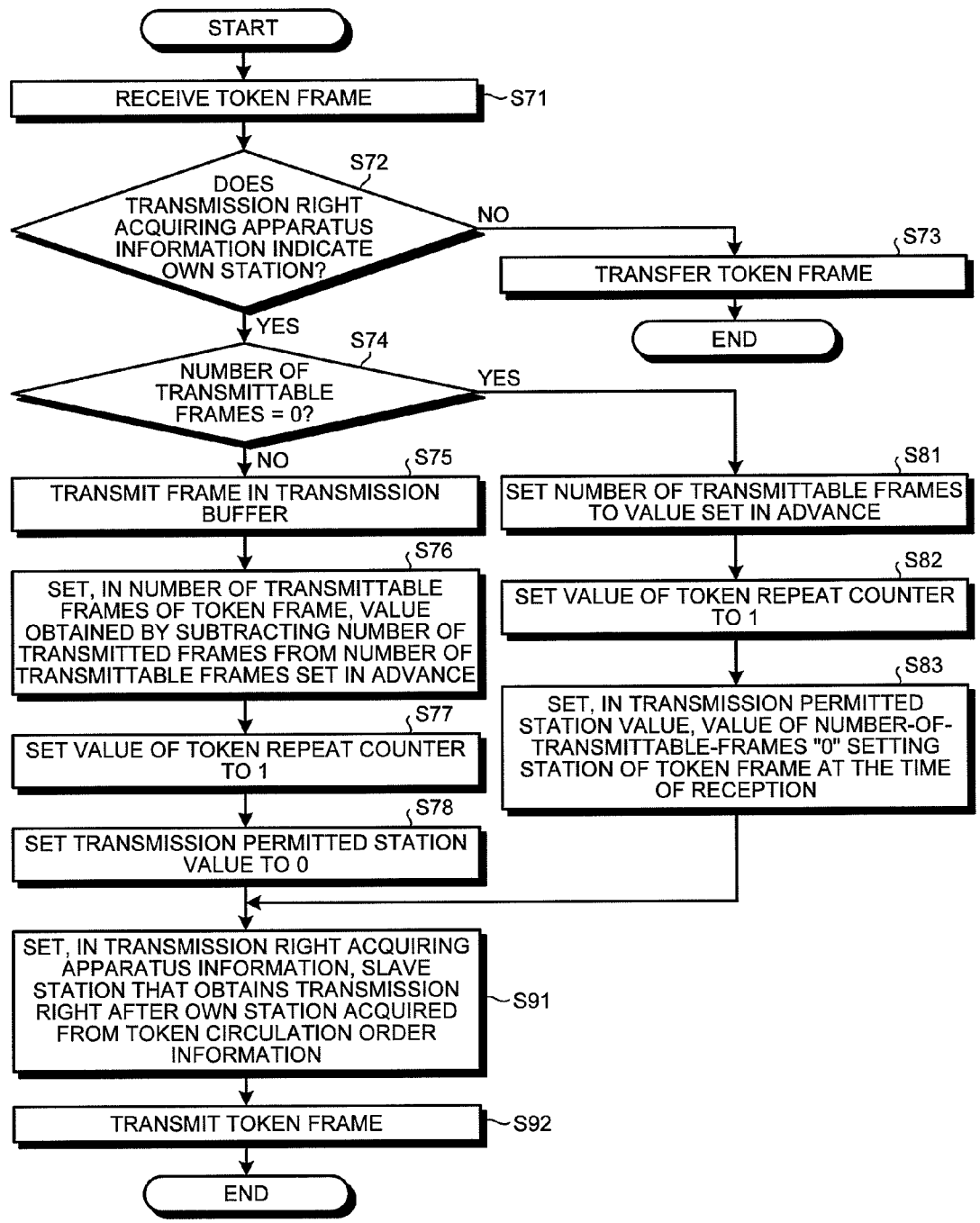
FIG. 6 is a flowchart for explaining an example of processing at the time of reception of the token frame in the master station.

FIG. 6 is a flowchart for explaining an example of processing at the time of token frame reception in the master station. First, when the token-frame processing unit 23 receives the token frame 200 (step S71), the token-frame processing unit 23 determines whether the transmission right acquiring apparatus information 206 of the token frame 200 indicates the own station (step S72). When the transmission right acquiring apparatus information 206 does not indicate the own station (No at step S72), the token-frame processing unit 23 transfers the token frame 200 (step S73) and the processing ends.

When the transmission right acquiring apparatus information 206 indicates the own station (Yes at step S72), the token-frame processing unit 23 checks whether the number of transmittable frames 209 of the received token frame 200 is "0" (step S74). When the number of transmittable frames is not "0" (No at step S74), the token-frame processing unit 23 of the master station recognizes that a communication node (a slave station) that cannot transmit a data frame is not present. In the next circulation of the token frame 200, the token-frame processing unit 23 performs setting processing for the token frame 200 to give the transmission right to the communication nodes in order according to the token circulation order information. Specifically, after the data-frame-communication processing unit 24 transmits a frame in the transmission buffer 25 within a range of the number of transmittable frames set in advance (step S75), the token-frame processing unit 23 sets, in the number of transmittable frames 209 of the token frame 200, a value obtained by subtracting the number of frames transmitted at step S75 from the number of transmittable frames set in advance (step S76), sets the value of the token repeat counter 207 to "1" (step S77), and sets the transmission permitted station value 208 to "0" (step S78).

On the other hand, when the number of transmittable frames 209 is "0" at step S74 (Yes at step S74), the token-frame processing unit 23 of the master station recognizes that a communication node (a slave station) that was not able to transmit a data frame while this token frame 200 circulated once is present. The token-frame processing unit 23 performs setting processing for the token frame 200 such that, in the next circulation of the token frame 200, data frames can be transmitted in order from the communication node (the slave station) that was not able to transmit a data frame. Specifically, the token-frame processing unit 23 sets the number of transmittable frames 209 of the token frame 200 to a value set in advance (step S81), sets the value of the token repeat counter 207 to "1" (step S82), and sets a value of the number-of-transmittable-frames "0" setting station 210 at the time of token frame 200 reception in the transmission permitted station value 208 (step S83).

Thereafter or after step S78, the token-frame processing unit 23 sets, in the transmission right acquiring apparatus information 206 of the token frame 200, a slave station, which obtains the transmission right after the own station, acquired from the token circulation order information in the token-circulation-order-information storing unit 22 (step S91). The token-frame processing unit 23 transmits a token frame set as explained above (step S92) and the processing ends.

The processing at steps S76 to S78 and S91 is setting processing for information in the data 204 of the token frame 200. Therefore, order of the processing does not have to be the order explained above. The same applies to the processing at steps S81 to S83 and S91.

Figures 2, 7:
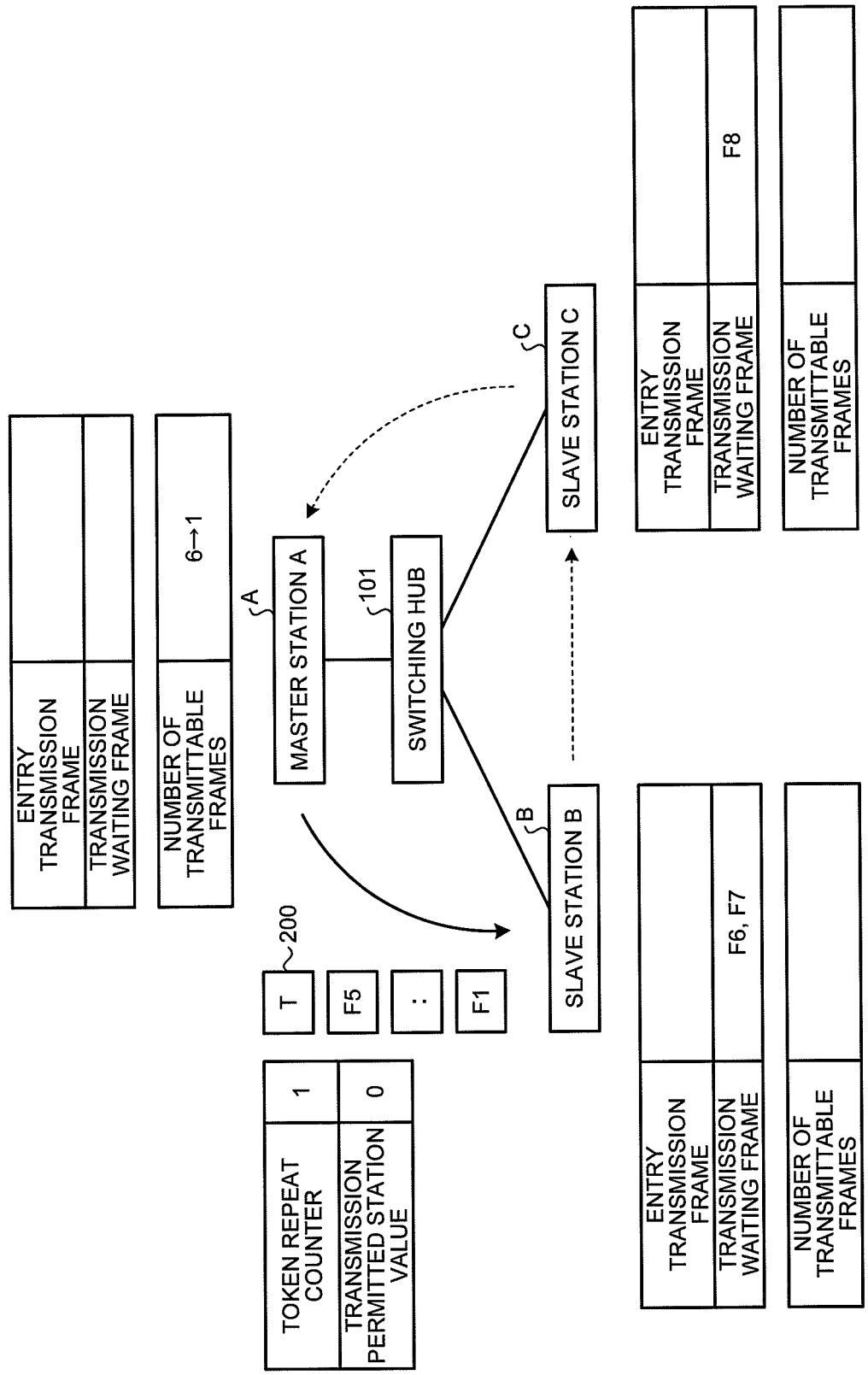
Figures 5, 7:
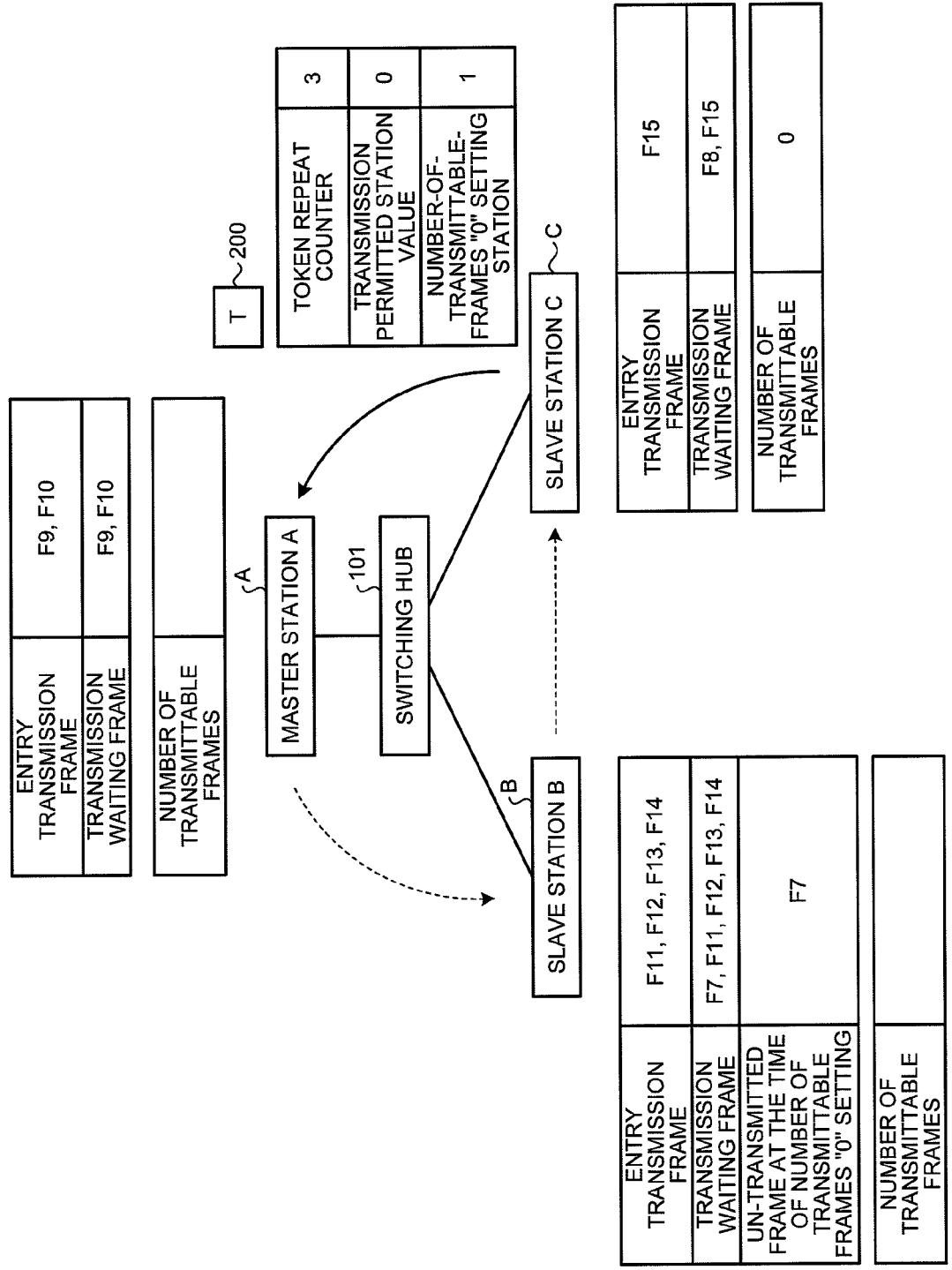

A communication method employing a token frame in such a communication system is explained below with reference to a specific example. FIGS. 7-1 to 7-9 are schematic diagrams for explaining an example of a communication method employing a token according to the first embodiment. It is assumed that the master station A has already performed configuration processing for a logical ring, determined the token circulation order indicated by (1) above, and acquired the transmission right first. In FIG. 7-1, a state of the communication system at a point when the master station A has acquired the transmission right is shown. In this state, in the master station A, for example, it is entered from an application layer to a data link layer to transmit frames F1 to F5 to the other slave stations B and C. These frames F1 to F5 are stored in the transmission buffer 25 in order as transmission waiting frames. Further, in the slave station B, it is entered from an application layer to a data link layer to transmit frames F6 and F7 to the other communication nodes. These frames F6 and F7 are stored in the transmission buffer in order as transmission waiting frames. In the slave station C, it is entered from an application layer to a data link layer to transmit a frame F8 to the other communication nodes. This frame F8 is stored in the transmission buffer as a transmission waiting frame.

Thereafter, as shown in FIG. 7-2, the token-frame processing unit 23 of the master station A sets the number of transmittable frames in the token frame 200 to a value set in the communication system in advance (assumed to be "6"). The data-frame-communication processing unit 24 of the master station A transmits the transmission waiting frames, which are stored in the transmission buffer 25, in order of storage in the transmission buffer 25 (in order from a frame stored earliest) within the range of the number of transmittable frames set in the token frame 200. The number of transmission waiting frames F1 to F5 stored in the transmission buffer 25 is "5" and the number of transmittable frames set in the token frame 200 is "6". Therefore, the data-frame-communication processing unit 24 transmits all the frames F1 to F5. Consequently, the number of frames that can be transmitted while this token frame 200 circulates once is "1 (6−5)". Thereafter, the token-frame processing unit 23 of the master station A transmits the token frame 200 in which the number of transmittable frames is set to "1", the token repeat counter is set to "1", the transmission permitted station value is set to "0" representing the own station, and the slave station B is set in the transmission right acquiring apparatus information. The transmitted frames F1 to F5 are erased from the transmission buffer 25.

Subsequently, when the slave station B receives the token frame 200 in which the transmission right acquiring apparatus information is set to the own station, the token-frame processing unit 23 of the slave station B compares the value of the token repeat counter in the token frame 200 and the transmission permitted station value and determines whether the own station can transmit data. Because the token repeat counter "1">the transmission permitted station value "0", the token-frame processing unit 23 recognizes that the slave station B has obtained a right for transmitting data in the range of the number of transmittable frames in the token frame 200.

Thereafter, as shown in FIG. 7-3, the data-frame-communication processing unit 63 of the slave station B transmits the transmission waiting frames, which are stored in the transmission buffer 64, in order of storage in the transmission buffer 64 (in order from a frame stored earliest) within the range of the number of transmittable frames set in the token frame 200. The number of transmission waiting frames F6 to F7 stored in the transmission buffer 64 is "2" and the number of transmittable frames set in the token frame 200 is "1". Therefore, the data-frame-communication processing unit 63 transmits only the frame F6. Consequently, the number of frames that can be transmitted until this token frame 200 returns to the master station A is "0 (1−1)". Thereafter, the token-frame processing unit 62 of the slave station B transmits the token frame 200 in which the number of transmittable frames is set to "0", the number-of-transmittable-stations "0" setting station is set to "1", which is a sequence number on the logical ring of the own station, the token repeat counter 207 is incremented by one to "2", and the slave station C stored in the token-circulation-destination-information storing unit 61 is set as the transmission right acquiring apparatus information. A value set in the number-of-transmittable-frames "0" setting station is a value set in the token repeat counter when the slave station B receives the token frame 200 and is a sequence number counted from the master station A on the logical ring.

The data-frame-communication processing unit 63 of the slave station B stores, as an un-transmitted frame at the time of the number of transmittable frames "0", the frame F7 in the transmission buffer 64 that could not be transmitted at the time of acquisition of the transmission right of this time. This can be performed by, for example, setting, in the transmission buffer 64, an item called un-transmitted frame at the time of the number of transmittable frames "0" setting and setting a flag in this item. To facilitate understanding of explanation, the figure is drawn such that an item "un-transmitted frame at the time of the number of transmittable frames "0" setting" is provided and the un-transmitted frame F7 in the transmission buffer 64 is stored in this item as well. The transmitted frame F6 is erased.

Subsequently, the token-frame processing unit 62 of the slave station C receives the token frame 200 in which the transmission right acquiring apparatus information is set to the own station, compares the value of the token repeat counter in the token frame 200 and the transmission permitted station value, and determines whether the own station can transmit data. Because the token repeat counter "2">the transmission permitted station value "0", the token-frame processing unit 62 recognizes that the slave station C has obtained a right for transmitting data in the range of the number of transmittable frames in the token frame 200.

Thereafter, as shown in FIG. 7-4, the slave station C attempts to transmit the transmission waiting frames stored in the transmission buffer 64 in order of storage in the transmission buffer 64 (in order from a frame stored earliest) within the range of the number of transmittable frames set in the token frame 200. Because the number of transmittable frames set in the token frame 200 is "0", the slave station C cannot transmit the frame F8 in the transmission buffer 64. Therefore, the token-frame processing unit 62 of the slave station C increments the token repeat counter by one to "3". Subsequently, the token-frame processing unit 62 transmits the token frame 200 in which the master station A stored in the token-circulation-destination-information storing unit 61 is set as the transmission right acquiring apparatus information.

In this token frame 200, the number of transmittable frames remains "0" and the number-of-transmittable-frames "0" setting station remains "1".

At this point, the data-frame-communication processing unit 63 of the slave station C stores, as an un-transmitted frame at the time of the last token reception, the frame F8 in the transmission buffer 64 that could not be transmitted at the time of acquisition of the transmission right of this time. This can be performed by, for example, setting an item called un-transmitted frame at the time of the last token reception and setting a flag in this item. To facilitate understanding of the explanation, the figure is drawn such that an item "un-transmitted frame at the time of the last token reception" is provided and the un-transmitted frame F8 in the transmission buffer 64 is stored in this item as well.

Thereafter, as shown in FIG. 7-5, it is assumed that, in a state immediately after the slave station C transmits the token frame 200 in which the transmission right acquiring apparatus information is set to the master station A, the communication nodes acquire new data that should be transmitted. Specifically, in the master station A, for example, it is entered from the application layer to the data link layer to transmit frames F9 and F10 to the other slave stations. These frames F9 and F10 are stored in the transmission buffer 25 in order as transmission waiting frames. In the slave station B, it is entered from the application layer to the data link layer to transmit frames F11 to F14 to the other communication nodes. These frames F11 to F14 are stored in the transmission buffer 64 in order as transmission waiting frames. In the slave station C, it is entered from the application layer to the data link layer to transmit a frame F15 to the other communication nodes. This frame F15 is stored in the transmission buffer 64 as a transmission waiting frame.

Subsequently, as shown in FIG. 7-6, when the token-frame processing unit 23 of the master station A receives the token frame 200 in which the transmission right acquiring apparatus information is set to the own station, the token-frame processing unit 23 checks the number of transmittable frames in the token frame 200. The token-frame processing unit 23 determines that, because the number of transmittable frames is "0", a communication node that, although the transmission right was obtained, was not able to transmit a frame, i.e., was not able to obtain the transmission right is present among the communication nodes in the logical ring. As a result, the data-frame-communication processing unit 24 of the master station A does not perform transmission processing for the frames F9 and F10 stored in the transmission buffer 25. The data-frame-communication processing unit 24 transmits the token frame 200 in which a value "6" set in advance is set to the number of transmittable frames of the received token frame 200, "1", which is a value of the number-of-transmittable-frames "0" setting station of the received token frame 200, is set to the transmission permitted station value, the token repeat counter 207 is reset to "1", and the slave station B is set as the transmission right acquiring apparatus information 206.

Subsequently, when the slave station B receives the token frame 200 in which the transmission right acquiring apparatus information 206 is set to the own station, the data-frame-communication processing unit 24 compares the value of the token repeat counter 207 in the token frame 200 and the transmission permitted station value 208 and determines whether the own station can transmit data. Because the value "1" of the token repeat counter 207=the transmission permitted station value 208 "1", i.e., the token repeat counter the transmission permitted station value, the data-frame-communication processing unit 24 recognizes that the slave station B has obtained a right for transmitting data in the range of the number of transmittable frames in the token frame 200.

Thereafter, as shown in FIG. 7-7, the data-frame-communication processing unit 24 of the slave station B identifies presence of "un-transmitted frames at the time of number of transmittable frames "0" setting" among the un-transmitted frames stored in the transmission buffer 64. The data-frame-communication processing unit 24 transmits the "un-transmitted frames at the time of number of transmittable frames "0" setting" in order of storage in the transmission buffer 64 (in order from a frame stored earliest) within the range of the number of transmittable frames set in the token frame 200. Because, although the frames F7 and F11 to F14 are stored in the transmission buffer 64, the "un-transmitted frame at the time of number of transmittable frames "0" setting" is the frame F7, the data-frame-communication processing unit 24 transmits only the frame F7. Consequently, the number of frames that can be transmitted until this token frame 200 returns to the master station A is "5 (=6−1)". Thereafter, the token-frame processing unit 62 of the slave station B transmits the token frame 200 in which "5" is set in the number of transmittable frames, the token repeat counter is incremented by one to "2", and the slave station C is set in the transmission right acquiring apparatus information. The slave station B stores, as the "un-transmitted frames at the time of last token reception", the frames F11 to F14 that were not able to be transmitted at the time of acquisition of the transmission right of this time. The number-of-transmittable-frames "0" setting station in the token frame 200 is not changed and is kept at the value set in the received token frame 200. The transmitted frame F7 is erased from the transmission buffer 64.

Subsequently, the slave station C receives the token frame 200 in which the transmission right acquiring apparatus information is set to the own station, compares the value of the token repeat counter in the token frame 200 and the transmission permitted station value, and determines whether the own station can transmit data. Because the token repeat counter "2">the transmission permitted station value "1", the slave station C recognizes that the slave station C has obtained a right for transmitting data in the range of the number of transmittable frames in the token frame 200.

Figures 7, 8:
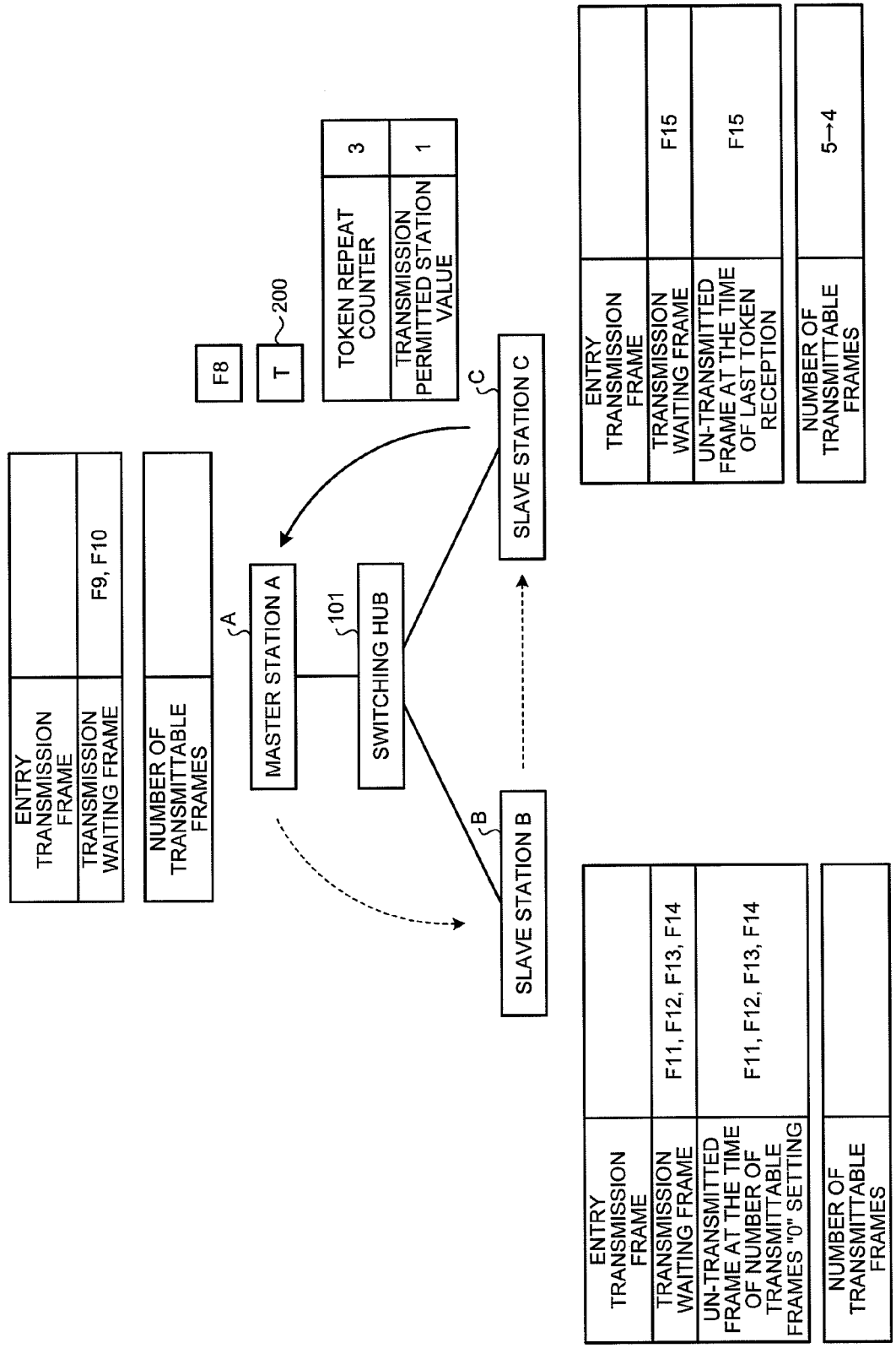
Figure 8:
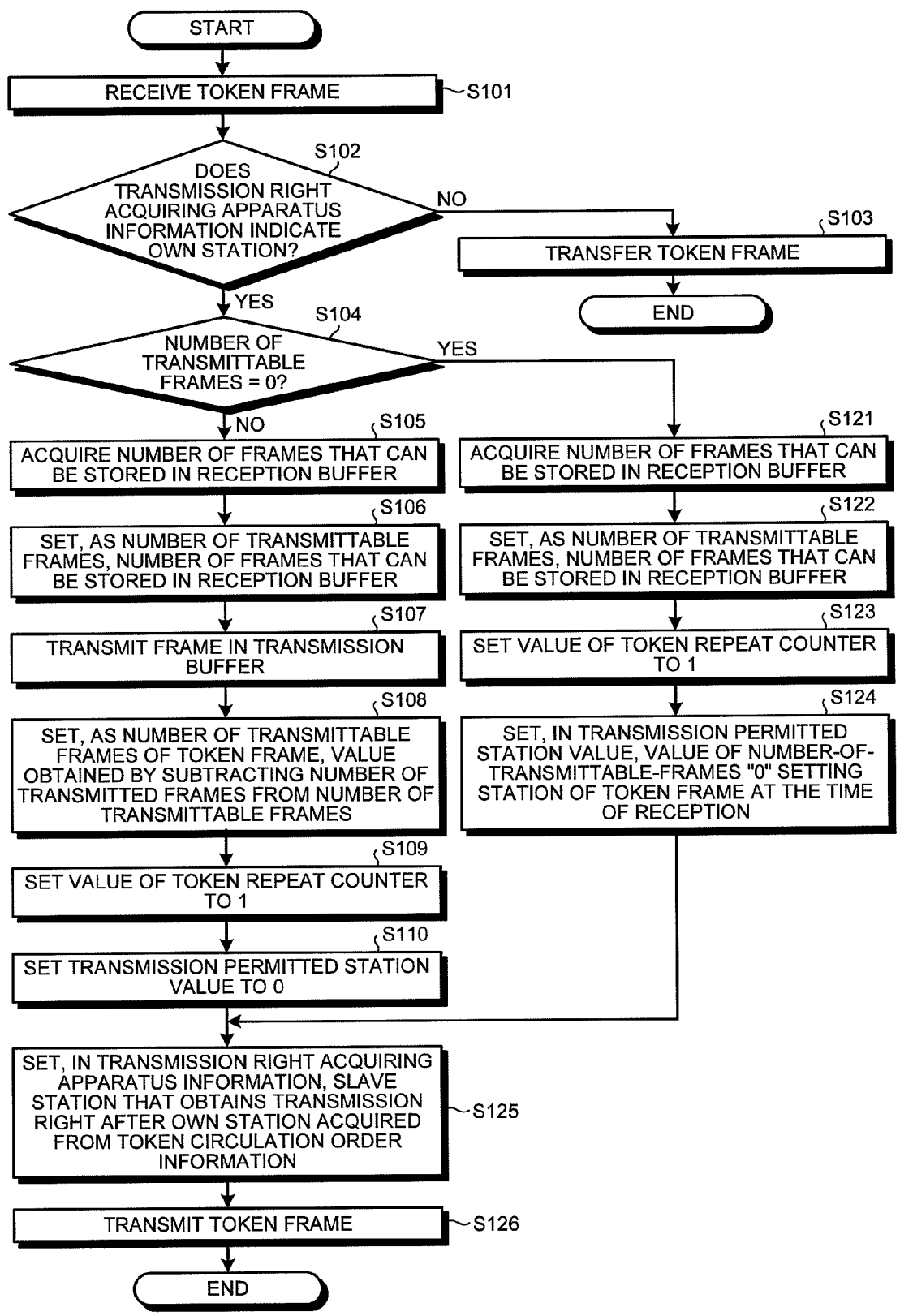

Thereafter, as shown in FIG. 7-8, the slave station C identifies presence of the "un-transmitted frame at the time of last token reception" among the transmission waiting frames stored in the transmission buffer 64. The data-frame-communication processing unit 24 transmits the "un-transmitted frames at the time of last token reception" in order of storage in the transmission buffer 64 (in the order from a frame stored earliest) within the range of the number of transmittable frames set in the token frame 200. Because, although the frames F8 and F15 are stored in the transmission buffer 64, the "un-transmitted frame at the time of last token reception" is the frame 8, only the frame 8 is transmitted. Consequently, the number of frames that can be transmitted until this token frame 200 returns to the master station A is "4 (=5−1)". Thereafter, the token-frame processing unit 62 of the slave station C transmits the token frame 200 in which the number of transmittable frames is set to "4", the token repeat counter is incremented by one to "3", and the master station A is set in the transmission right acquiring apparatus information. The data-frame-communication processing unit 24 of the slave station C stores, as an un-transmitted frame at the time of last token reception, the frame F15 in the transmission buffer 64 that could not be transmitted at the time of acquisition of the transmission right of this time. The number-of-transmittable-frames "0" setting station in the token frame 200 is not changed and is kept at the value set in the received token frame 200. The transmitted frame F8 is erased from the transmission buffer 64.

Subsequently, when the token-frame processing unit 23 of the master station A receives the token frame 200 in which the transmission right acquiring apparatus information is set to the own station, the token-frame processing unit 23 checks the number of transmittable frames in the token frame 200. Because the number of transmittable frames is "4", the token-frame processing unit 23 determines that all communication nodes in the logical ring were able to transmit frames.

Thereafter, as shown in FIG. 7-9, the data-frame-communication processing unit 24 of the master station A performs transmission processing for the frames F9 to F10 stored in the transmission buffer 25. Thereafter, the token-frame processing unit 23 transmits the token frame 200 in which "4" obtained by subtracting the number of transmitted frames "2" from the value "6" set in advance as the number of transmittable frames is set in the number of transmittable frames of the token frame 200, "0" representing the own station is set in the transmission permitted station value, the token repeat counter is reset to "1", and the slave station B is set in the transmission right acquiring apparatus information. The value of the number-of-transmittable-frames "0" setting station in the token frame 200 can be kept as it is without being changed or can be erased. Thereafter, the processing explained above is repeatedly executed. Frames that should be transmitted by the communication nodes are transmitted.

According to the first embodiment, it is determined whether data in a transmission waiting state in the communication nodes can be transmitted in unit of a frame. Therefore, it is unnecessary to calculate an amount of data in the transmission waiting state unlike the past. As a result, it is possible to reduce time after the token frame 200 is received until data is transmitted. Because the transmission in unit of a frame is performed, when it is determined whether data can be transmitted according to a data amount as in the past, if an amount of data that should be transmitted in a certain communication node exceeds an amount of data that can be transmitted in the communication system, not all the data that should be transmitted could not be transmitted. However, in the first embodiment, it is possible to transmit data in frame unit in the range of the number of transmittable frames 209.

Specifically, when the token repeat counter 207 is equal to or larger than the transmission permitted station value 208, it is determined whether the own station has the transmission right according to whether the number of transmittable frames 209 in the token frame 200 is "0". Therefore, when there is at least one transmittable frame number 209 until the token frame 200 returns to the master station, the slave station can transmit a frame. As a result, there is an effect that real-time communication is possible. There is also an effect that it is possible to efficiently transmit frames while the token frame 200 circulates once.

Further, in the configuration of the logical ring, the token repeat counter 207 that is incremented by one every time the token frame 200 circulates through the slave stations starting from the master station set as a 0th communication node. Therefore, the slave station can recognize, with this token repeat counter 207, which slave station counted from the master station in the logical ring the slave station is. Making use of this, a value of the token repeat counter 207 of a slave station in which the number of transmittable frames 209 is set to "0" is stored in the token frame 200 as the number-of-transmittable-frames "0" setting station 210. The master station sets the number-of-transmittable-frames "0" setting station 210 in the transmission permitted station value 208. Therefore, it is possible to cause a slave station having data that could not be transmitted at the time of last acquisition of the token frame to transmit the data. As a result, there is an effect that data generated by stations can be transmitted in order from data generated earliest and it is possible to perform communication with importance attached to real-time properties.

Further, frames that were not able be transmitted at the time of acquisition of the token frame 200 are stored as last-time un-transmitted frames. When the token frame 200 is acquired next, only the last-time un-transmitted frames are transmitted. Therefore, there is an effect that, even when a frame that should be transmitted is generated until the token frame 200 is acquired next after being acquired last time, it is possible to collectively transmit frames subjected to transmission entry in substantially the same periods in the entire communication system in order from a frame stored in the communication node earliest.

Second Embodiment

As in the first embodiment, in a communication system that includes a master station and slave stations, performs an arithmetic operation using data from the slave stations, and notifies the slave stations of a result of the arithmetic operation, it is likely that the data transmitted by the slave stations concentrate in the master station. It is also likely that, in the master station, a processing ability of transmission and reception processing is temporarily more deteriorated than other processing, a reception buffer is in a full state, and frames are discarded. When such a situation occurs, transmission retry processing is carried out to recover discarded data. However, this recovery processing leads to deterioration in performance of a network, the master station, and the slave stations. Therefore, in the second embodiment, a communication system and a communication method that can perform transmission and reception of data without performing the recovery processing when a processing ability of reception processing is temporarily deteriorated in the master station are explained.

The master station according to the second embodiment further has a function of acquiring, when the token-frame processing unit 23 receives the token frame 200 in which the transmission right acquiring apparatus information 206 indicates the own station in the first embodiment, the number of receivable buffers from a state of use of the reception buffer 26 and setting the number of receivable buffers in the number of transmittable frames 209 of the token frame 200. For example, when a maximum number of stored frames of the reception buffer 26 is n (n is a natural number) and m (m is a natural number, n≥m) frames are stored in the reception buffer 26 at a point when the token frame 200 is acquired, "n−m" is set in the number of transmittable frames 209 of the token frame 200. Components same as those in the first embodiment are denoted by the same reference numerals and signs and explanation of the components is omitted. The configuration of the slave station according to the second embodiment is the same as that in the first embodiment. Therefore, explanation of the configuration of the slave station is omitted.

A communication method for data according to the second embodiment is explained below. FIG. 8 is a flowchart for explaining an example of processing at the time of token frame reception by the master station. First, as at steps S71 to S74 explained with reference to FIG. 6 in the first embodiment, the token-frame processing unit 23 of the master station transfers the token frame 200 in which the transmission right acquiring apparatus information 206 does not indicate the own station and, in the case of the token frame 200 transmitted to the own station, determines whether the number of transmittable frames 209 is "0" (steps S101 to S104).

When the number of transmittable frames 209 is not "0" (No at step S104), the token-frame processing unit 23 of the master station acquires the number of frames that can be stored in the reception buffer 26 at the present point (step S105). For example, in a state in which four frames are stored in the reception buffer 26 that can store up to six frames, two frames can be stored. The token-frame processing unit 23 sets, as the number of transmittable frames 209 of the token frame 200, the acquired number of frames that can be stored in the reception buffer 26 (step S106). Subsequently, after the data-frame-communication processing unit 24 transmits frames in the transmission buffer 25 within a range of the set number of transmittable frames 209 (step S107), the token-frame processing unit 23 sets, in the number of transmittable frames 209 of the token frame 200, a value obtained by subtracting the number of frames transmitted at step S107 from the number of transmittable frames 209 set at step S106 (step S108). The token-frame processing unit 23 sets a value of the token repeat counter 207 to "1" (step S109) and sets the transmission permitted station value 208 to "0" (step S110).

On the other hand, when the number of transmittable frames 209 in the token frame 200 received at step S104 is "0" (Yes at step S104), the token-frame processing unit 23 of the master station acquires the number of frames that can be stored in the reception buffer 26 (step S121). The token-frame processing unit 23 sets, as the number of transmittable frames 209 of the token frame 200, the acquired number of frames that can be stored in the reception buffer 26 (step S122). The token-frame processing unit 23 sets the value of the token repeat counter 207 to "1" (step S123) and sets, in the transmission permitted station value 208, a value of the number-of-transmittable-frames "0" setting station 210 at the time of token frame reception (step S124).

Thereafter or after step S110, as at steps S91 and S92 in FIG. 6, the token-frame processing unit 23 sets, in the transmission right acquiring apparatus information 206 of the token frame 200, a slave station, which obtains a transmission right after the own station, acquired from token circulation order information (step S125). The token-frame processing unit 23 transmits a token frame set as explained above (step S126) and the processing ends.

A communication method employing a token frame in such a communication system is explained below with reference to a specific example. FIGS. 9-1 to 9-8 are schematic diagrams for explaining an example of a procedure of a communication method employing a token frame according to the second embodiment. It is assumed that the master station A can process up to six frames. Specifically, it is assumed that the reception buffer 26 of the master station A can store up to six frames. Further, it is assumed that the master station A has already performed configuration processing for a logical ring, determined the token circulation order indicated by (1) in the first embodiment, and notified the slave stations B and C of information concerning the token circulation order (token circulation destination information) and, thereafter, the token frame is circulating according to the token circulation order.

As shown in FIG. 9-1, it is assumed that, at a point when a token frame in which transmission right acquiring apparatus information is set to the master station A is transmitted from the slave station C, in the slave station B, it is entered from the application layer to the data link layer to transmit five frames F1 to F5 to the master station A and these frames F1 to F5 are stored in the transmission buffer 64 in order as transmission waiting frames.

Thereafter, as shown in FIG. 9-2, when the master station A receives the token frame 200 in which the transmission right acquiring apparatus information 206 is set to the own station, the master station A checks the number of transmittable frames in the token frame 200. It is assumed that the number of transmittable frames is returned as a number that is not "0". Therefore, there is no slave station that, although the transmission right was obtained, was not able to transmit a frame explained in the first embodiment. The master station A performs normal communication for giving the transmission right in order according to the frame circulation order.

The data-frame-communication processing unit 24 of the master station A can transmit frames of the transmission buffer 25 because the own station obtains the transmission right. However, at this point, because there is no frame that should be transmitted, the data-frame-communication processing unit 24 does not perform transmission processing. Thereafter, the token-frame processing unit 23 of the master station A transmits the token frame 200 in which the number of transmittable frames is set to the value "6" set in the communication system in advance, the token repeat counter is reset to "1", the transmission permitted station value is set to "0" representing the own station, and the slave station B is set in the transmission right acquiring apparatus information 206.

Subsequently, when the token-frame processing unit 62 of the slave station B receives the token frame 200 in which the transmission right acquiring apparatus information is set to the own station, the token-frame processing unit 62 compares the value of the token repeat counter in the token frame 200 and the transmission permitted station value and determines whether the own station can transmit data. Because the token repeat counter "1">the transmission permitted station value "0", the token-frame processing unit 62 recognizes that the slave station B has obtained a right or transmitting data in a range of the number of transmittable frames in the token frame 200.

Thereafter, as shown in FIG. 9-3, the data-frame-communication processing unit 63 of the slave station B transmits the transmission waiting frames stored in the transmission buffer 64 in order of storage in the transmission buffer 64 (in order from a frame stored earliest) within the range of the number of transmittable frames set in the token frame 200. Because the number of transmission waiting frames F1 to F5 stored in the transmission buffer 64 is "5" and the number of transmittable frames set in the token frame 200 is "6", the data-frame-communication processing unit 63 transmits all the frames F1 to F5 to the master station A. Consequently, the number of frames that can be transmitted until this token frame 200 returns to the master station A is "1 (=6−5)". Thereafter, the token-frame processing unit 62 of the slave station B transmits the token frame 200 in which the number of transmittable frames has been set to "1", the token repeat counter is incremented by 1 to "2", and the slave station C is set in the transmission right acquiring apparatus information. The transmitted frames F1 to F5 are erased from the transmission buffer 64.

Data transmitted from the slave station B is received by the master station A and temporarily stored in the reception buffer 26. As a result, five frames are stored in the reception buffer 26 of the master station A. Therefore, the number of reception buffer processable frames is "1".

Subsequently, the slave station C receives the token frame 200 in which the transmission right acquiring apparatus information is set to the own station, compares the value of the token repeat counter in the token frame 200 and the transmission permitted station value, and determines whether the own station can transmit data. Because the token repeat counter "2">the transmission permitted station value "0", the slave station C recognizes that the slave station C has obtained a right for transmitting data in the range of the number of transmittable frames in the token frame 200.

Thereafter, as shown in FIG. 9-4, the slave station C attempts to transmit the transmission waiting frames stored in the transmission buffer 64 in order of storage in the transmission buffer 64 (in order from a frame stored earliest) within the range of the number of transmittable frames "1" set in the token frame 200. However, because there is no data that should be transmitted in the transmission buffer 64, eventually, the slave station C does not transmit a frame.

The token-frame processing unit 62 of the slave station C transmits the token frame 200 in which the token repeat counter is incremented by one to "3" and the master station A is set in the transmission right acquiring apparatus information. In this token frame 200, the number of transmittable frames remains "1".

It is assumed that, in time until the transmission of the token frame 200 by the slave station C, in the master station A, processing of one frame among the frames stored in the reception buffer 26 has ended and a storage capacity for two frames has been secured in the reception buffer. In other words, it is assumed that the number of reception buffer processable frames of the master station A has increased to "2".

It is assumed that, thereafter, as shown in FIG. 9-5, in a state immediately after the slave station C transmits the token frame 200 in which the transmission right acquiring apparatus information has been set to the master station A, in the slave station C, it is entered from the application layer to the data link layer to transmit the frames F6 to F9 to the master station A and these frames F6 to F9 are stored in the transmission buffer 64 as transmission waiting frames.

Subsequently, as shown in FIG. 9-6, when the master station A receives the token frame 200 in which the transmission right acquiring apparatus information has been set to the own station, the master station A checks the number of transmittable frames in the token frame 200. Because the number of transmittable frames 209 is "1", the master station A determines that all the communication nodes in the logical ring were able to transmit frames. As a result, the master station A can perform transmission processing for frames stored in the transmission buffer 25. However, in this example, because no frame is stored in the transmission buffer 25, the transmission processing for frame by the master station A is not performed.

The master station A originally sets a value "6", which is set in the communication system in advance, as the number of transmittable frames of the token frame 200. However, because the number of reception buffer processable frames is "2", the master station A transmits the token frame 200 in which "2" has been set in the number of transmittable frames of the token frame 200, the token repeat counter has been reset to "1", and the slave station B has been set in the transmission right acquiring apparatus information.

Subsequently, when the slave station B receives the token frame 200 in which the transmission right acquiring apparatus information has been set to the own station, the slave station B compares the value of the token repeat counter in the token frame 200 and the transmission permitted station value and determines whether the own station can transmit data. Because the token repeat counter "1">the transmission permitted station value "0", the slave station B recognizes that the slave station B has obtained a right for transmitting data in the range of the number of transmittable frames in the token frame. However, because no frame is present in the transmission buffer 64 of the slave station B, the slave station B does not perform transmission processing for frames.

Thereafter, as shown in FIG. 9-7, the slave station B transmits the token frame 200 in which the token repeat counter has been incremented by one to "2" and the slave station C has been set in the transmission right acquiring apparatus information. The number of transmittable frames in the token frame 200 is not changed and is kept at a value set in the received token frame 200.

Subsequently, the slave station C receives the token frame 200 in which the transmission right acquiring apparatus information is set to the own station, compares the value of the token repeat counter in the token frame 200 and the transmission permitted station value, and determines whether the own station can transmit data. Because the token repeat counter "2">the transmission permitted station value "0", the slave station C recognizes that the slave station C has obtained a right for transmitting data in the range of the number of transmittable frames in the token frame.

Thereafter, as shown in FIG. 9-8, the data-frame-communication processing unit 63 of the slave station C transmits the transmission waiting frames stored in the transmission buffer 64 in order of storage in the transmission buffer 64 (in order from a frame stored earliest) within the range of the number of transmittable frames 209 set in the token frame 200. The frames F6 to F9 have been stored in the transmission buffer 64. However, because the number of transmittable frames is "2", the data-frame-communication processing unit 63 transmits only the frames F6 and F7. Consequently, the number of frames that can be transmitted until this token frame 200 returns to the master station A is "0 (=2−2)". Thereafter, the token-frame processing unit 62 of the slave station C transmits the token frame 200 in which the number of transmittable frames has been set to "0", "2", which is a value of the token repeat counter at the time when a token frame is received (represents the own station), has been set in the number-of-transmittable-frames "0" setting station, the token repeat counter is incremented by one to "3", and the master station A has been set in the transmission right acquiring apparatus information. The slave station C stores, as untransmitted frames at the time of the number of transmittable frames "0", the frames F8 and F9 in the transmission buffer 64 that were not able to be transmitted at the time of acquisition of the transmission right of this time. The transmitted frames F6 and F7 are erased from the transmission buffer 64. Thereafter, the processing explained above or the processing explained in the first embodiment is performed.

As explained above, the number of transmittable frames is variably set according to the reception processing ability of the master station A and transmission processing for frames corresponding to the setting is performed.

According to the second embodiment, the number of frames that can be transmitted when the next token is circulated is set according to the reception processing ability of the master station. Therefore, it is possible to prevent data from concentrating on the master station and prevent frames from being discarded because the reception buffer is full. Because recovery processing by the discarding of frames is not performed, there is also an effect that it is possible to prevent deterioration in communication performance and data processing performance in the master station, the slave stations, and the communication system including these communication nodes.

Third Embodiment

For example, in an FA system in which a programmable controller corresponding to the master station and control target apparatuses corresponding to the slave stations are connected by a network, arithmetic processing is performed by the programmable controller based on data output from the control target apparatuses and a result of the arithmetic operation is output to the control target apparatuses to perform control of the control target apparatuses. Therefore, real-time properties of data are requested. In such a case, when high accuracy is required for the result of the arithmetic processing, a large amount of data from the control target apparatuses are required. When very high accuracy is not required for the result of the arithmetic processing, the amount of data from the control target apparatus can be small. In this way, in the FA system, there are degrees of importance concerning the control target apparatuses.

Therefore, when a load of transmission requests from the slave stations temporarily increases, if reception processing for data from all the slave stations is performed by the method explained in the first embodiment, it is likely that data from the control target apparatuses having high degrees of importance cannot be easily received and highly-accurate arithmetic processing cannot be performed. Therefore, in the third embodiment, a communication system and a communication method that can preferentially transmit data from slave stations having high degrees of importance to the master station are explained.

Figures 10, 11:
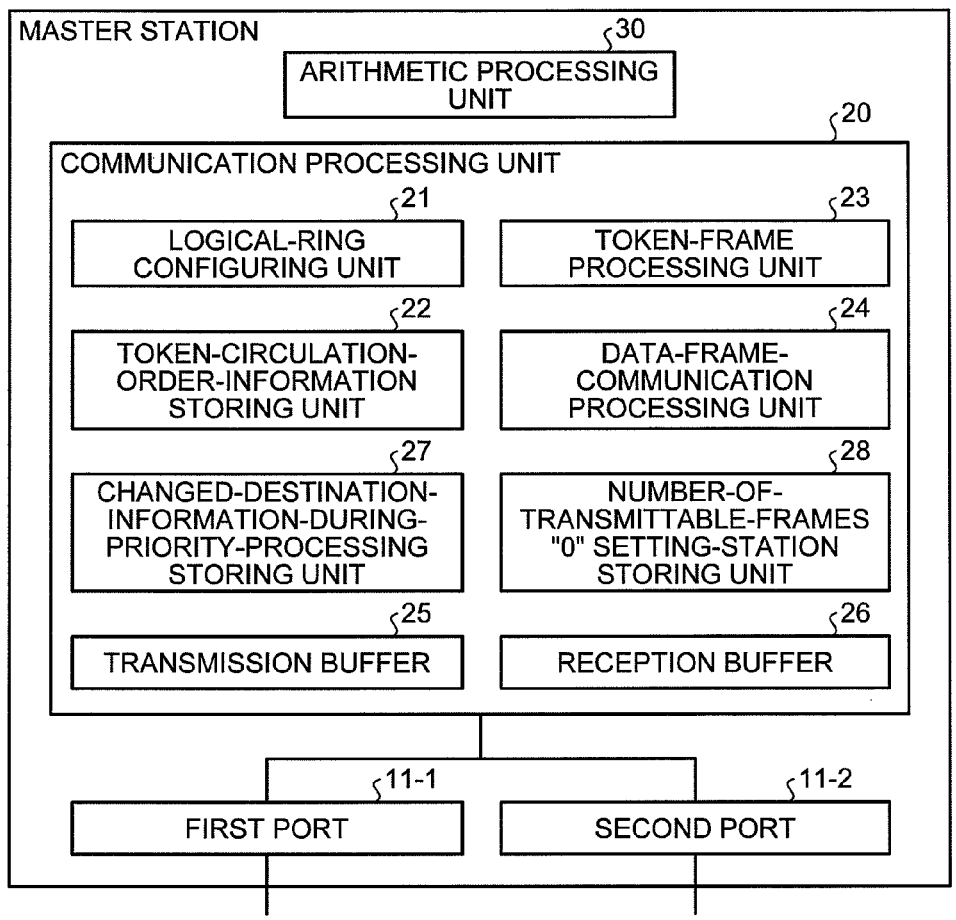
FIG. 10 is a schematic block diagram of a functional configuration of a master station according to a third embodiment.
FIG. 11 is a schematic diagram for explaining a relation among station numbers, sequence numbers, and priority levels of communication nodes included in a communication system.

FIG. 10 is a schematic block diagram of a functional configuration of a master station according to the third embodiment. This master station further includes, in the configurations of the first and second embodiments, a changed-destination-information-during-priority-processing storing unit 27 that stores changed destination information during priority processing that indicates to which slave station a transmission right is preferentially given when a load of transmission requests of slave stations increases and a number-of-transmittable-frames "0" setting-station storing unit 28 that stores the number-of-transmittable-frames "0" setting station 210 in the token frame 200 when a load of transmission requests of the slave stations increases. The token-frame processing unit 23 determines whether or not a load of transmission requests of the slave stations has increased according to whether or not the number of transmittable frames 209 in the token frame 200 is "0".

The changed destination information during priority processing stored in the changed-destination-information-during-priority-processing storing unit 27 is set to a slave station having an earliest token circulation turn among slave stations with a priority level set highest in a logical ring (token circulation order). The priority levels of the slave stations have been set in advance according to types of the slave stations or set by a user.

FIG. 11 is a schematic diagram of a relation between station numbers and sequence numbers of communication nodes included in a communication system. The station numbers are information arbitrarily set by the user to uniquely identify the communication nodes of the communication system. The sequence numbers are numbers that indicate order of arrangement of the slave stations with the master station A set as a reference in the logical ring as explained in the first embodiment. The master station A stores the station numbers and the sequence numbers in association with each other in, for example, the token circulation order information of the token-circulation-order-information storing unit 22. Information concerning a priority level of a communication node having which station number is to be set high by the user is stored in the changed-destination-information-during-priority-processing storing unit 27 as changed destination information during priority processing. For example, if a priority level of the slave stations C and E is the highest, the slave station C is selected as the changed destination information during priority processing. This is because, by selecting the slave station C, a token frame circulates to the slave station E having the high priority level in a later logical ring. Information concerning the station numbers set in the communication nodes is acquired from the communication nodes during logical ring configuration processing by the logical-ring configuring unit 21, whereby the relation shown in FIG. 11 can be obtained as association between the station numbers and the sequence numbers of the communication nodes.

When the token-frame processing unit 23 receives the token frame 200 and the number of transmittable frames of the received token frame is "0", the token-frame processing unit 23 stores, in the number-of-transmittable-frames "0" setting-station storing unit 28, a value of the number-of-transmittable-frames "0" setting stations stored in the token frame 200 and sets, in the transmission permitted station value of the token frame 200, the changed destination information during priority processing stored in the changed-destination-information-during-priority-processing storing unit 27. When the token-frame processing unit 23 receives the token frame 200 in which the transmission right acquiring apparatus information is set to the own station in a state in which the number-of-transmittable-frames "0" setting station is stored in the number-of-transmittable-frames "0" setting-station storing unit 28, the token-frame processing unit 23 generates the token frame 200 in which the number-of-transmittable-frames "0" setting station stored in the number-of-transmittable-frames "0" setting-station storing unit 28 is set in the transmission permitted station value and erases information in the number-of-transmittable-frames "0" setting-station storing unit 28.

Components same as those explained in the first and second embodiments are denoted by the same reference numerals and signs and explanation of the components is omitted. The configuration of the slave station is the same as that explained in the first and second embodiments. Therefore, explanation of the configuration is also omitted.

Figures 1, 12:
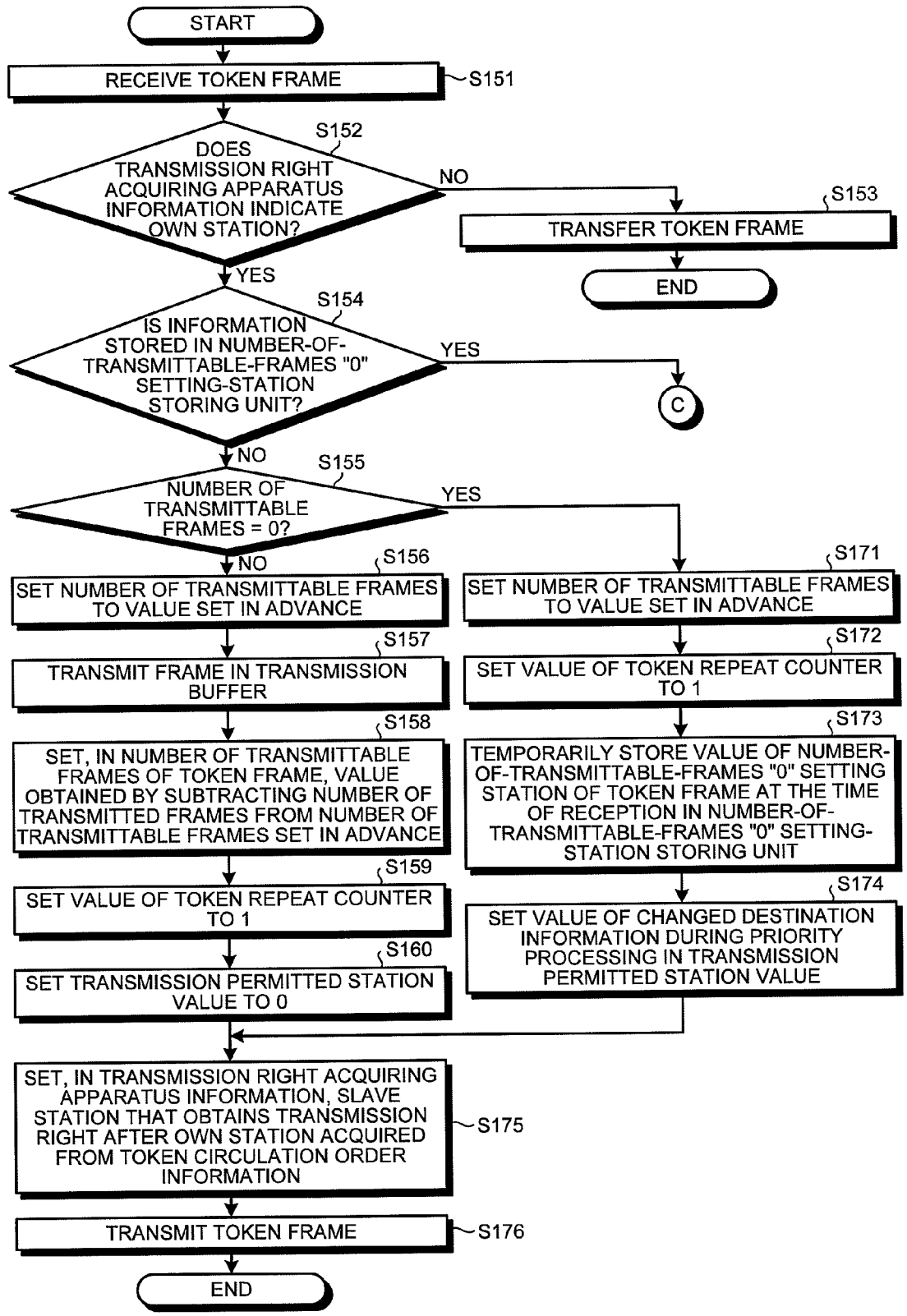

A processing procedure by the master station for giving a data transmission right to a slave station desired to be given priority is explained below. FIGS. 12-1 and 12-2 are flowcharts for explaining an example of a processing procedure for a token frame of the master station according to the third embodiment. First, as at steps S71 to S73 explained with reference to FIG. 6 in the first embodiment, the token-frame processing unit 23 of the master station transfers the token frame 200 in which the transmission right acquiring apparatus information 206 does not indicate the own station (steps S151 to S153).

In the case of the token frame 200 in which the transmission right acquiring apparatus information 206 indicates the own station, the token-frame processing unit 23 determines whether information is stored in the number-of-transmittable-frames "0" setting-station storing unit 28 (step S154). When information is not stored in the number-of-transmittable-frames "0" setting-station storing unit 28 (No at step S154), the token-frame processing unit 23 recognizes that the last circulation of the token frame 200 is not processing for causing a communication node having a high priority level to perform transmission of data (hereinafter referred to as processing of a priority mode) and the token frame 200 for equally giving the data transmission right to the communication nodes in the communication system explained in the first and second embodiments has been issued. Therefore, subsequently, the token-frame processing unit 23 determines whether the number of transmittable frames 209 in the token frame 200 is "0" (step S155).

When the number of transmittable frames 209 is not "0" (No at step S155), the token-frame processing unit 23 determines that a load of transmission requests of the communication nodes included in the communication system has not increased. Thereafter, the token-frame processing unit 23 sets the number of transmittable frames to a value set in advance (step S156). The data-frame-communication processing unit 24 transmits a frame in the transmission buffer 25 (step S157). The token-frame processing unit 23 sets, in the number of transmittable frames 209 of the token frame 200, a value obtained by subtracting the number of frames transmitted at step S157 from the number of transmittable frames set at step S156 (step S158). The token-frame processing unit 23 resets "1" in the token repeat counter 207 (step S159) and sets "0" in the transmission permitted station value 208 of the token frame 200 (step S160). The token-frame processing unit 23 sets a communication node conforming to the token circulation order information in the transmission right acquiring apparatus information 206 (step S175) and transmits the token frame 200 (step S176) and the processing ends.

On the other hand, when the number of transmittable frames is 0 at step S155 (Yes at step S155), the token-frame processing unit 23 determines that a load of transmission requests of the communication nodes included in the communication system has temporarily increased. Thereafter, the token-frame processing unit 23 sets the number of transmittable frames to a value set in advance (step S171) and resets "1" in the token repeat counter 207 (step S172). The token-frame processing unit 23 stores, in the number-of-transmittable-frames "0" setting-station storing unit 28, the number-of-transmittable-frames "0" setting station 210 in the received token frame 200 (step S173) and sets, in the transmission permitted station value 208, a value stored in the changed destination information during priority processing of the changed-destination-information-during-priority-processing storing unit 27 (step S174). Thereafter, the processing at step S175 and subsequent steps is performed.

When information is stored in the number-of-transmittable-frames "0" setting-station storing unit 28 at step S154 (Yes at step S154), the master station recognizes that the processing in the priority mode was performed at the time of the last circulation of the token frame 200. Therefore, the token-frame processing unit 23 of the master station sets the number of transmittable frames to a value set in advance (step S181). The data-frame-communication processing unit 24 transmits a frame in the transmission buffer 25 (step S182). The token-frame processing unit 23 sets, in the number of transmittable frames 209 of the token frame 200, a value obtained by subtracting the number of frames transmitted at step S182 from the number of transmittable frames set at step S181 (step S183). The token-frame processing unit 23 resets the token repeat counter 207 in the token frame 200 to "1" (step S184), sets, in the transmission permitted station value 208, the number-of-transmittable-frames "0" setting station stored in the number-of-transmittable-frames "0" setting-station storing unit 28 (step S185), and sets a communication node conforming to the token circulation order information in the transmission right acquiring apparatus information 206 (step S186). The token-frame processing unit 23 transmits the token frame 200 in which the various kinds of information in the data 204 have been set as explained above (step S187). At this point, the token-frame processing unit 23 erases the number-of-transmittable-frames "0" setting station stored in the number-of-transmittable-frames "0" setting-station storing unit 28. Consequently, the processing ends.

A specific example of transmission processing for a token frame according to the third embodiment is explained below. FIGS. 13-1 to 13-5 are schematic diagrams of an example of the transmission processing for a token frame according to the third embodiment. This communication system is configured by connecting one master station A and three slave stations B to D via the switching hub 101. It is assumed that token circulation order has been determined as indicated by (2) below by the logical-ring configuring unit 21 of the master station A. It is assumed that, after the master station A notifies the slave stations B to D of information concerning the token circulation order indicated by (2) below (token circulation destination information), the token frame 200 circulates in the communication system according to the token circulation order.

Master station A→slave station B→slave station C→slave station D→master station A   (2)

It is assumed that a priority level of data transmitted from the slave station B is high and "2", which indicates the slave station B as the changed destination information during priority processing is set in the changed-destination-information-during-priority-processing storing unit 27. It is assumed that the reception buffer 26 of the master station A can store up to six frames.

First, as shown in FIG. 13-1, the slave station C has acquired a transmission right in which the number of transmittable frames is "3" and transmits the frames F1 to F3 among the transmission waiting frames F1 to F5 of the transmission buffer 64. The slave station C transmits the token frame 200 in which the number of transmittable frames has been set to "0", the number-of-transmittable-frames "0" setting station 210 has been set to "2", which is a sequence number of the own station, the token repeat counter has been set to "3", and the transmission right acquiring apparatus information has been set to the slave station D. The slave station C stores, as un-transmitted frames at the time of number of transmittable frames "0" setting, the frames F4 and F5 in the transmission buffer 64 that were not able to be transmitted.

Subsequently, as shown in FIG. 13-2, the slave station D acquires the transmission right as explained in the first embodiment. However, the slave station D cannot transmit the un-transmitted frames F6 and F7 in the transmission buffer 64. Therefore, the slave station D transmits the token frame 200 in which the token repeat counter 207 has been set to "4" and the transmission right acquiring apparatus information has been set to the master station A. The slave station D stores, as un-transmitted frames at the time of last token reception, the frames F6 and F7 in the transmission buffer 64 that have not been able to be transmitted.

It is assumed that, at a point immediately after the token frame 200 in which the transmission right acquiring apparatus information has been set to the master station A is transmitted from the slave station D, in the slave station B, it is entered from the application layer to the data link layer to transmit six frames F8 to F13 to the master station A and these frames F8 to F13 are stored in the transmission buffer 64 in order as transmission waiting frames. Further, it is assumed that, in the slave station C, it is entered from the application layer to the data link layer to transmit two frames F14 and F15 to the master station A and these frames F14 and F15 are stored in the transmission buffer 64 in order as transmission waiting frames. It is assumed that, at this point, in the master station A, data is stored in the reception buffer 26 to the full storage capacity by the frames F1 to F3 received from the slave station C.

In such a state, when the token-frame processing unit 23 of the master station A receives the token frame 200 in which the transmission right acquiring apparatus information has been set to the own station, the token-frame processing unit 23 checks whether information is stored in the number-of-transmittable-frames "0" setting-station storing unit 28. It is assumed that information is not stored in the number-of-transmittable-frames "0" setting-station storing unit 28. Thereafter, the token-frame processing unit 23 further checks the number of transmittable frames in the token frame 200. Because the number of transmittable frames is "0", the token-frame processing unit 23 shifts to the priority mode for preferentially transmitting data of the slave station B set in advance in the changed destination information during priority processing of the changed-destination-information-during-priority-processing storing unit 27.

As shown in FIG. 13-3, the master station A stores, in the number-of-transmittable-frames "0" setting-station storing unit 28, the number-of-transmittable-frames "0" setting station 210 in the received token frame 200. Subsequently, the master station A transmits the token frame 200 in which the number of transmittable frames is set to the value "6" set in advance in the communication system, the token repeat counter has been reset to "1", the transmission permitted station value has been set to the value "1" (=the slave station B) stored in the changed destination information during priority processing, and the slave station B has been set in the transmission right acquiring apparatus information.

Thereafter, the slave station B receives the token frame 200 in which the transmission right acquiring apparatus information 206 has been set to the own station and compares the value of the token repeat counter 207 in the token frame 200 and the transmission permitted station value 208. Because the token repeat counter "1"=the transmission permitted station value "1", the slave station B recognizes that the transmission right has been obtained.

As shown in FIG. 13-4, the slave station B transmits the six frames F8 to F13 within a range specified by the number of transmittable frames among the transmission waiting frames stored in the transmission buffer 64. Thereafter, the slave station B transmits the token frame 200 in which the token repeat counter has been incremented by one to "2", the number of transmittable frames has been set to "0", and the transmission right acquiring apparatus information has been set to the slave station C. It is assumed that, while data is transmitted in the priority mode, even if the number of transmittable frames is "0", setting (writing) in the number-of-transmittable-frames "0" setting station in the token frame 200 is not performed.

In the method in the first embodiment, the master station A sets the information in the data of the token frame 200 to give the priority right to the slave station C set in the number-of-transmittable-frames "0" setting station in FIG. 13-2. However, in the third embodiment, when the number of processable frames of the reception buffer 26 of the master station A is "0", the transmission right is given to the slave station B stored in the changed-destination-information-during-priority-processing storing unit 27.

Subsequently, the token frame 200 circulates to the slave stations C and D in order. However, because the number of transmittable frames is "0" in both the slave stations C and D, a data frame cannot be transmitted. As shown in FIG. 13-5, the slave station D transmits the token frame 200 in which the token repeat counter has been set to "4", the number of transmittable frames has been set to "0", and the transmission right acquiring apparatus information has been set to the master station A.

Thereafter, as shown in FIG. 13-5, the master station A receives the token frame 200 in which the transmission right acquiring apparatus information has been set to the own station and checks whether information is stored in the number-of-transmittable-frames "0" setting-station storing unit 28. Because information has been stored, the token-frame processing unit 23 of the master station A sets, in the transmission permitted station value of the token frame 200, the value "2" stored in the number-of-transmittable-frames "0" setting-station storing unit 28. The token-frame processing unit 23 generates and transmits the token frame 200 in which the token repeat counter has been reset to "1", the number of transmittable frames is set to "6", and "1" indicating the slave station B has been set in the transmission right acquiring apparatus information. When generation processing for the token frame 200 ends, the token-frame processing unit 23 erases the information stored in the number-of-transmittable-frames "0" setting-station storing unit 28.

Thereafter, processing same as the processing explained in the first embodiment is performed. Specifically, first, the transmission right is given to the slave station C, the frames F4 and F5 stored as un-transmitted frames at the time of number of transmittable frames "0" setting in the transmission buffer 64 are transmitted, and the frames F6 and F7 stored as un-transmitted frames at the time of last token reception in the transmission buffer 64 of the slave station D are transmitted.

In the example explained above, a load of communication requests of the slave stations temporarily increases. However, the processing explained above is not performed only in this case. It is also possible to execute the same processing for shifting the communication system to the priority mode, for example, when reception processing of the master station has been deteriorated.

According to the third embodiment, when the number of transmittable frames of a received token frame is "0", the transmission right is given to a slave station having a high priority level set in advance, contents of the number-of-transmittable-frames "0" setting station 210 are temporarily stored, and the transmission right is not given to the slave stations set in the number-of-transmittable-frames "0" setting station 210. As a result, there is an effect that it is possible to transmit, while maintaining real-time properties, data of the slave stations that need to frequently transmit data to the master station.

Fourth Embodiment

In a fourth embodiment, another method of giving a transmission right to a slave station having the highest priority level among slave stations in a communication system when the number of transmittable frames of a received token frame is "0".

FIG. 14 is a diagram of an example of a format of a token frame used in the fourth embodiment. In this token frame 200, the transmission permitted station value 208 shown in FIG. 3 includes a start transmission permitted station value 208*a* and an end transmission permitted station value 208*b* for specifying a range on a logical ring of the slave stations that are caused to preferentially perform data transmission. Specifically, when the number of transmittable frames of the received token frame is "0" and the communication system shifts to the priority mode, the start transmission permitted station value 208*a* indicates a sequence number of a first communication node to which the transmission right is preferentially given among communication nodes on the logical ring. The end transmission permitted station value 208*b* indicates a sequence number of the last communication node to which the transmission right is preferentially given among the communication nodes on the logical ring. As a result, among the communication nodes on the logical ring, communication nodes from the communication node having the sequence number of the start transmission permitted station value 208*a* to the communication node having the sequence number of the end transmission permitted station value 208*b* obtain the transmission right and perform transmission of data frames.

The configuration of the master station is different from the configuration in the third embodiment in that changed destination information during priority processing including a start transmission right permitted station value and an end transmission right permitted station value in shifting to the priority mode is stored in the changed-destination-information-during-priority-processing storing unit 27. Otherwise, the configuration of the master station is the same as the configuration in the third embodiment. Therefore, explanation of the configuration is omitted.

The configuration of the slave station is different from the configurations in the first to third embodiments in that, after the token-frame processing unit 62 receives the token frame 200 in which the transmission right acquiring apparatus information 206 indicates the own station, the token-frame processing unit 62 determines whether a value of the token repeat counter 207 is equal to or larger than the start transmission permitted station value 208*a* and equal to or smaller than the end transmission permitted station value 208*b*. Otherwise, the configuration of the slave station is the same as the configuration in the first to third embodiments. Therefore, explanation of the configuration is omitted.

A communication method in the communication system in such a configuration is the same as the communication method explained in the third embodiment. Therefore, explanation of the communication method is also omitted.

According to the fourth embodiment, when the number of transmittable frames of the received token frame is "0", a start sequence number and an end sequence number on the logical ring of the communication nodes desired to be caused to preferentially transmit data are designated. Therefore, there is an effect that it is possible to cause a set of arbitrarily selected communication nodes on the logical ring to preferentially transmit data. The data transmission processing in shifting to the priority mode is performed only by the communication nodes in the range set by the start transmission permitted station value and the end transmission permitted station value. Therefore, compared with the third embodiment, it is possible to reduce processing performed while the token frame circulates once.

In the third and fourth embodiments, a priority-processing-information setting unit can be provided in the master station. A slave station input by a user and desired to be given priority can be set in the changed-destination-information-during-priority-processing storing unit 27. Consequently, it is possible to perform, according to an occurred event, control of the transmission right of the slave station desired to be given priority.

In the first to fourth embodiments, the size of a frame transmitted by a communication node that has obtained the transmission right is not specifically limited. However, it is also possible to set the master station to transmit only frames equal to or shorter than predetermined length. When a frame longer than the set predetermined length is transmitted, data only has to be divided into transmittable length in a layer higher than the data link layer. When the data is received, a receiving side only has to collect the divided data into one.

Fifth Embodiment

The communication system according to the first to fourth embodiments can be applied to, for example, an FA network (an FA system) including a control target apparatus and a control apparatus such as a programmable controller that performs a predetermined arithmetic operation using a state of the control target apparatus as input data, and outputs an operation condition for the control target apparatus as output data.

In the FA network, synchronous data (cyclic data) always transmitted from communication nodes at the time of token frame reception and asynchronous data (un-cyclic data) that do not have to be periodically transmitted because real-time properties are not regarded as important coexist. Examples of the synchronous data include control data such as data for a master station to control slave stations and data acquired by the slave stations necessary for an arithmetic processing by the master station. Examples of the asynchronous data include data such as a control log of the slave stations.

In such a network, the functions explained in the first to fourth embodiments do not have to be applied to all data transmitted in the communication system. Specifically, when a communication node receives a token frame in which the own station is set in transmission right acquiring apparatus information, the communication node always transmits the synchronous data and transmits the asynchronous data according to the method explained in the first to fourth embodiments.

In this case, it is sufficient that a flag for determining whether a frame is a synchronous frame or an asynchronous frame (an asynchronous frame determining flag) is provided in the frame, a communication node that has acquired the transmission right reads asynchronous frame determining flag information of the frame, applies the first to fourth embodiments only to the asynchronous frame, and always transmits the synchronous frame when the transmission right is acquired.

According to the fifth embodiment, there is an effect that it is possible to change, according to the importance of data, a target for which real-time properties are secured.

The communication methods in the master station and the slave station can be realized by executing computer programs, in which processing procedures of the respective communication methods are written, with a computer such as a programmable controller or a personal computer having a CPU (central processing unit). In this case, the CPU (control means) of the computer executes the processing steps of the communication methods explained above according to the computer programs. These computer programs are recorded in a computer-readable recording medium such as a hard disk, a floppy (registered trademark) disk, a CD (Compact Disk)-ROM (Read Only Memory), an MO (Magneto-Optical disk), or a DVD (Digital Versatile Disk or digital Video Disk) and executed by being read out from the recording medium by the computer. These computer programs can also be distributed via a network (a communication line) such as the Internet.

Further, the master station can be a communication management circuit in which the processing units described in the embodiments are realized by a circuit that executes processing according to the processing procedure explained above. Similarly, the slave circuit can also be a communication circuit in which the processing units described in the embodiments are realized by a circuit that executes processing according to the processing procedure explained above.

Furthermore, the master station can also be an LSI (Large-Scale Integration) in which the processing units described in the embodiments are manufactured to execute processing according to the processing procedure. Similarly, the slave station can also be an LSI in which the processing units described in the embodiments are manufactured to execute processing according to the processing procedure.

INDUSTRIAL APPLICABILITY

As explained above, the communication management apparatus according to the present invention is useful for a communication apparatus that manages a data transmission right in a network system connected by an Ethernet in which real-time properties of data communication is requested.

The invention claimed is:

1. A communication management apparatus that manages transmission of data in a network in which the communication management apparatus and one or more communication apparatuses are connected by an Ethernet cable, the communication management apparatus comprising:

a token-circulation-order storing unit that stores token circulation order for circulating a token frame in the network;

a token-frame receiving unit that receives the token frame and determines whether transmission right acquiring apparatus information for acquiring a transmission right next in the received token frame indicates the communication management apparatus;

a token-frame transmitting unit that transmits the token frame in which:

a first transmission right acquisition determination information indicating sequence numbers of the one or more communication apparatuses that can acquire the transmission right in the token circulation order is set, a second transmission right acquisition determination information indicating a specific number of frames that can be transmitted while the token frame circulates once from the communication management apparatus is set, wherein the specific number is variable based on a calculation, and the transmission right acquiring apparatus information that indicates a next transmission destination of the token frame, after the communication management apparatus, acquired from the token circulation order is set; and a data-frame-communication processing unit that performs reception processing for data frames from other communication nodes and, when the transmission right is acquired, converts data stored in the communication management apparatus into a first set of data frames in frame unit and transmits one or more of the data frames in the first set of data frames, wherein:

the first transmission right acquisition determination information comprises:

a token circulation number indicating a first sequence number counted from the communication management apparatus in the token circulation order of a communication apparatus set in the transmission right acquiring apparatus information, and a transmission permitted station value indicating a second sequence number in the token circulation order of a communication apparatus that can transmit a data frame; and the token-frame transmitting unit sets "1" in the token circulation number and sets, in the transmission permitted station value, a value corresponding to information in the received token frame, wherein:

in the received token frame, when the second transmission right acquisition determination information is "0" and the number of transmittable frames "0" setting station information, which indicates a communication apparatus that sets the second transmission right acquisition determination information to "0", is set:

the token-frame receiving unit does not give a transmission instruction for a data frame to the data-frame-communication processing unit, and the token-frame transmitting unit sets the number of transmittable frames "0"

setting station information in the transmission permitted station value of the token frame, and wherein the communication management apparatus further comprises a number-of-transmittable-frames "0" setting-station storing unit, wherein a third sequence number of a communication apparatus to which the transmission right is preferentially given when the second transmission right acquisition determination information is "0" is stored in a changed-destination-information-during-priority-processing storing unit, the token-frame-receiving unit stores, when the token-frame receiving unit receives a token frame in which the transmission right acquiring apparatus information indicates the communication management apparatus and the second transmission right acquisition determination information is "0", contents of the number-of-transmittable-frames "0" setting station information in the number-of-transmittable-frames "0" setting-station storing unit, and the token-frame transmitting unit sets, in the transmission permitted station value, the third sequence number stored in the changed-destination-information-during-priority-processing storing unit.

2. The communication management apparatus according to claim 1, wherein
a start transmission permitted station value and an end transmission permitted station value indicating a third sequence number in a range of the communication apparatus to which the transmission right is preferentially given are stored in the changed-destination-information-during-priority-processing unit, and
the token-frame transmitting unit sets, when the second transmission right acquisition determination information of the received token frame is "0", the start transmission permitted station value and the end transmission permitted station value in the transmission permitted station value of the token frame.

3. The communication management apparatus according to claim 1, wherein, when the number of transmittable frames "0" setting station information is stored in the number-of-transmittable-frames "0" setting-station storing unit, the token-frame transmitting unit sets, when the token-frame transmitting unit receives the token frame in which the transmission right acquiring apparatus information indicates the communication management apparatus, the number of transmittable frames "0" setting station information in the transmission permitted station value of the token frame and erases the number of transmittable frames "0" setting station information stored in the number-of-transmittable-frames "0" setting-station storing unit.

4. A communication apparatus that acquires, in a network in which one communication management apparatus and one or more communication apparatuses are connected by an Ethernet cable, a token frame circulated according to a token circulation order determined by the communication management apparatus and performs transmission of data, the communication apparatus comprising:
a token-circulation-destination-information storing unit that stores token circulation destination information including a communication node that transmits the token frame next;
a token-frame receiving unit that receives the token frame that determines whether transmission right acquiring apparatus information indicating a communication node that acquires a transmission right next in the received token frame indicates the communication apparatus and determines, when the transmission right acquiring apparatus information indicates the communication apparatus, whether there is a transmission right for data frames using first transmission right acquisition determination information indicating sequence numbers of one or more communication apparatuses that can acquire the transmission right in the token circulation order in the token frame and second transmission right acquisition determination information indicating a specific number of transmittable frames at the time of the token frame reception, wherein the specific number is variable based on a calculation;
a token-frame transmitting unit that transmits the token frame in which the token circulation destination information is set in the transmission right acquiring apparatus information and a value obtained by subtracting, when a data-frame-communication processing unit transmits data frames, the specific number of the transmitted data frames from the second transmission right acquisition determination information at the time of the token frame reception is set in the second transmission right acquisition determination information;
a transmission buffer that stores, in frame unit, data transmitted to other communication nodes; and
a data-frame-communication processing unit that performs reception processing for data frames from the other communication nodes and, when the transmission right is acquired, converts the data stored in the transmission buffer into a first set of data frames in frame unit and transmits one or more of the data frames in the first set of data frames,
wherein:
the first transmission right acquisition determination information comprises:
a token circulation number indicating a first sequence number counted from the communication management apparatus in the token circulation order of a communication apparatus set in the transmission right acquiring apparatus information; and
a transmission permitted station value indicating a second sequence number in the token circulation order of a communication apparatus that can transmit a data frame,
when the token-frame receiving unit receives the token frame in which the transmission right acquiring apparatus information indicates the communication apparatus, the token-frame receiving unit determines presence or absence of the transmission right using the token circulation number and the transmission permitted station value, and
the token-frame transmitting unit sets, in the token circulation number, the first sequence number of a communication apparatus corresponding to the token circulation destination information,
wherein:
when the token circulation number in the token frame is equal to or larger than the transmission permitted station value and the second transmission right acquisition determination information is larger than "0", the token-frame receiving unit determines that the transmission right has been acquired, and
the data-frame-communication processing unit transmits a first data frame within a range of the second transmission right acquisition determination information,
wherein:
the token frame further includes number of transmittable frames "0" setting station information indicating a communication node that sets the second transmission right acquisition determination information to "0", and
when the second transmission right acquisition determination information changes to "0" according to the transmission of the first data frame by the data-frame-communication processing unit, the token-frame transmitting unit sets a value of the token circulation number at the time of the token frame reception in the number of transmittable frames "0" setting station information, and
wherein the data-frame-communication processing unit attaches, to data in the transmission buffer, last-time un-transmitted data identification information for identifying data that, although stored in the transmission buffer at a point when the token frame was received, could not be transmitted and, when data attached with the last-time un-transmitted data identification information is present in the transmission buffer at the time of next or subsequent transmission right acquisition, transmits only the data attached with the last-time un-transmitted data identification information within a range of the second transmission right acquisition determination information of the token frame.

5. A communication apparatus that acquires, in a network in which one communication management apparatus and one or more communication apparatuses are connected by an Ethernet cable, a token frame circulated according to a token circulation order determined by the communication management apparatus and performs transmission of data, the communication apparatus comprising:

a token-circulation-destination-information storing unit that stores token circulation destination information including a communication node that transmits the token frame next;

a token-frame receiving unit that receives the token frame that determines whether transmission right acquiring apparatus information indicating a communication node that acquires a transmission right next in the received token frame indicates the communication apparatus and determines, when the transmission right acquiring apparatus information indicates the communication apparatus, whether there is a transmission right for data frames using first transmission right acquisition determination information indicating sequence numbers of one or more communication apparatuses that can acquire the transmission right in the token circulation order in the token frame and second transmission right acquisition determination information indicating a specific number of transmittable frames at the time of the token frame reception, wherein the specific number is variable based on a calculation;

a token-frame transmitting unit that transmits the token frame in which the token circulation destination information is set in the transmission right acquiring apparatus information and a value obtained by subtracting, when a data-frame-communication processing unit transmits data frames, the specific number of the transmitted data frames from the second transmission right acquisition determination information at the time of the token frame reception is set in the second transmission right acquisition determination information;

a transmission buffer that stores, in frame unit, data transmitted to other communication nodes; and a data-frame-communication processing unit that performs reception processing for data frames from the other communication nodes and, when the transmission right is acquired, converts the data stored in the transmission buffer into a first set of data frames in frame unit and transmits one or more of the data frames in the first set of data frames, wherein:

the first transmission right acquisition determination information comprises:

a token circulation number indicating a first sequence number counted from the communication management apparatus in the token circulation order of a communication apparatus set in the transmission right acquiring apparatus information; and a transmission permitted station value indicating a second sequence number in the token circulation order of a communication apparatus that can transmit a data frame, when the token-frame receiving unit receives the token frame in which the transmission right acquiring apparatus information indicates the communication apparatus, the token-frame receiving unit determines presence or absence of the transmission right using the token circulation number and the transmission permitted station value, and the token-frame transmitting unit sets, in the token circulation number, the first sequence number of a communication apparatus corresponding to the token circulation destination information, and wherein, when the token circulation number in the received token frame is equal to or larger than the transmission permitted station value and the second transmission right acquisition determination information is "0", the data-frame-communication processing unit attaches, to data in the transmission buffer, last-time un-transmitted data identification information for identifying data that, although stored in the transmission buffer at a point when the token frame was received, could not be transmitted and, when data attached with the last-time un-transmitted data identification information is present in the transmission buffer at the time of next or subsequent transmission right acquisition, transmits only the data attached with the last-time un-transmitted data identification information within a range of the second transmission right acquisition determination information of the token frame.

* * * * *